(12) United States Patent
Mazzaccherini et al.

(10) Patent No.: US 11,780,109 B2
(45) Date of Patent: Oct. 10, 2023

(54) METHOD AND MACHINE FOR CUTTING LOGS OF WOUND WEB MATERIAL

(71) Applicant: Fabio Perini S.p.A., Lucca (IT)

(72) Inventors: Graziano Mazzaccherini, Porcari (IT); Franco Montagnani, Palaia (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 17/126,252

(22) Filed: Dec. 18, 2020

(65) Prior Publication Data

US 2021/0122076 A1 Apr. 29, 2021

Related U.S. Application Data

(63) Continuation of application No. 15/507,089, filed as application No. PCT/EP2015/067518 on Jul. 30, 2015, now Pat. No. 10,899,034.

(30) Foreign Application Priority Data

Aug. 29, 2014 (IT) .............................. FI2014A000194

(51) Int. Cl.
*B26D 7/26* (2006.01)
*B23Q 3/157* (2006.01)
(Continued)

(52) U.S. Cl.
CPC ........... *B26D 7/2621* (2013.01); *B23Q 3/155* (2013.01); *B23Q 3/1574* (2013.01);
(Continued)

(58) Field of Classification Search
CPC .... B23Q 3/155; B23Q 3/157; B23Q 3/15722; B23Q 3/15713; B23Q 3/15766;
(Continued)

(56) References Cited

U.S. PATENT DOCUMENTS 3,709,623 A * 1/1973 Stephan ............... B23Q 16/065
483/54
4,173,846 A 11/1979 Steiner et al.
(Continued)

FOREIGN PATENT DOCUMENTS

DE 3326292 C * 1/1985 ......... B23Q 11/0875
DE 9113684 U1 * 2/1992 ............. B23Q 3/155
(Continued)

OTHER PUBLICATIONS

DE9113684 English Translation; Feb. 1992; Keuro Maschinenbau GMBH & CO B23Q3/155.*

*Primary Examiner* — Laura M Lee
(74) *Attorney, Agent, or Firm* — Breiner & Breiner, L.L.C.

(57) ABSTRACT

The cutting machine for cutting logs of web material, includes a cutting head arranged along the feeding path of the logs. The cutting head includes a coupling for a disc-shaped cutting blade and is designed to impart the disc-shaped cutting blade a rotary motion around the axis thereof and a cyclic movement to cut the logs into single rolls, and to allow the logs to move forward along the feeding path. The machine also includes a store unit for disc-shaped cutting blades associated with the cutting head. A handling member is provided to remove a worn disc-shaped cutting blade from the cutting head and replace the worn disc-shaped cutting blade with a new disc-shaped cutting blade taken from the store unit.

12 Claims, 28 Drawing Sheets

(51) Int. Cl.
  *B23Q 3/155* (2006.01)
  *B26D 1/157* (2006.01)
  *B26D 3/16* (2006.01)
  *B26D 5/22* (2006.01)
  *B26D 7/12* (2006.01)
(52) U.S. Cl.
  CPC ..... *B23Q 3/15713* (2013.01); *B23Q 3/15722* (2016.11); *B26D 1/157* (2013.01); *B26D 3/16* (2013.01); *B26D 5/22* (2013.01); *B26D 7/12* (2013.01); *B23Q 2003/15531* (2016.11); *B23Q 2003/155411* (2016.11); *Y10T 83/303* (2015.04)
(58) Field of Classification Search
  CPC .............. B23Q 3/1574; B23Q 3/15531; B23Q 17/2461; B23Q 3/15773; B27B 5/32; Y10T 83/303; Y10T 83/313; Y10T 408/37; Y10T 483/179; Y10T 483/1733
  USPC ........ 83/174, 954, 488, 1, 411.6; 483/30, 54
  See application file for complete search history.

(56) References Cited

U.S. PATENT DOCUMENTS

| | | | | |
|---|---|---|---|---|
| 4,528,743 A | * | 7/1985 | Bleich | B24B 45/003 483/33 |
| 4,907,337 A | * | 3/1990 | Krusi | B27M 1/08 408/56 |
| 5,522,292 A | * | 6/1996 | Biagiotti | B26D 5/22 83/38 |
| 5,887,579 A | * | 3/1999 | Eriksson | B27B 5/32 125/14 |
| 5,997,454 A | * | 12/1999 | Naldi | B23B 31/261 483/36 |
| 6,030,326 A | * | 2/2000 | Azuma | B27B 5/32 483/31 |
| 6,786,808 B1 | | 9/2004 | Biagiotti | |
| 7,462,144 B2 | * | 12/2008 | Braun | B23Q 3/15706 483/23 |
| 7,988,531 B2 | * | 8/2011 | Braun | B23Q 3/15706 451/10 |
| 8,652,017 B2 | * | 2/2014 | Braun | B23C 5/08 483/30 |
| 9,492,903 B2 | * | 11/2016 | Kitamura | B23Q 3/15539 |
| 10,576,562 B1 | * | 3/2020 | Nishijima | B23Q 3/005 |
| 10,946,546 B2 | * | 3/2021 | Chike | B27B 5/18 |
| 2020/0078977 A1 | * | 3/2020 | Caroselli | B23Q 1/012 |

FOREIGN PATENT DOCUMENTS

| | | | |
|---|---|---|---|
| DE | 102005003220 A1 | 8/2006 | |
| JP | 2013248672 A | 12/2013 | |
| WO | WO-2004026514 A1 * | 4/2004 | ........... B23D 35/008 |
| WO | WO201317897 * | 11/2013 | ......... B23Q 3/15513 |
| WO | 2016030124 A1 | 3/2016 | |

\* cited by examiner

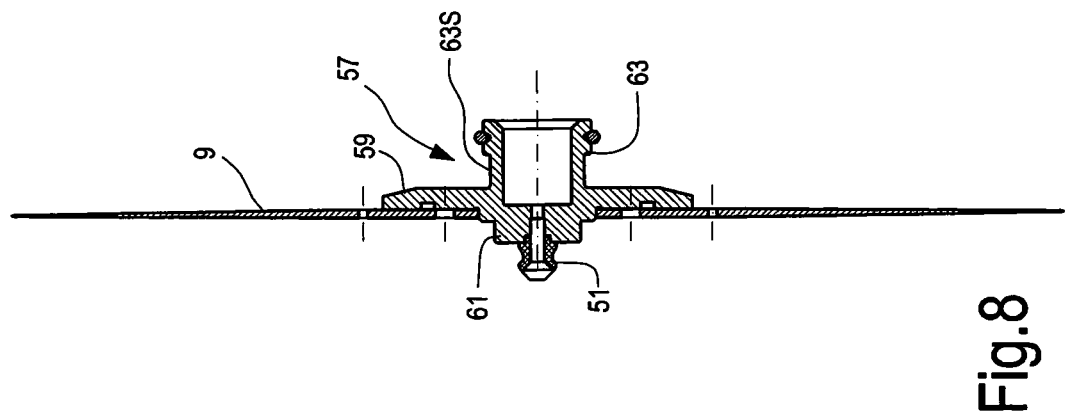
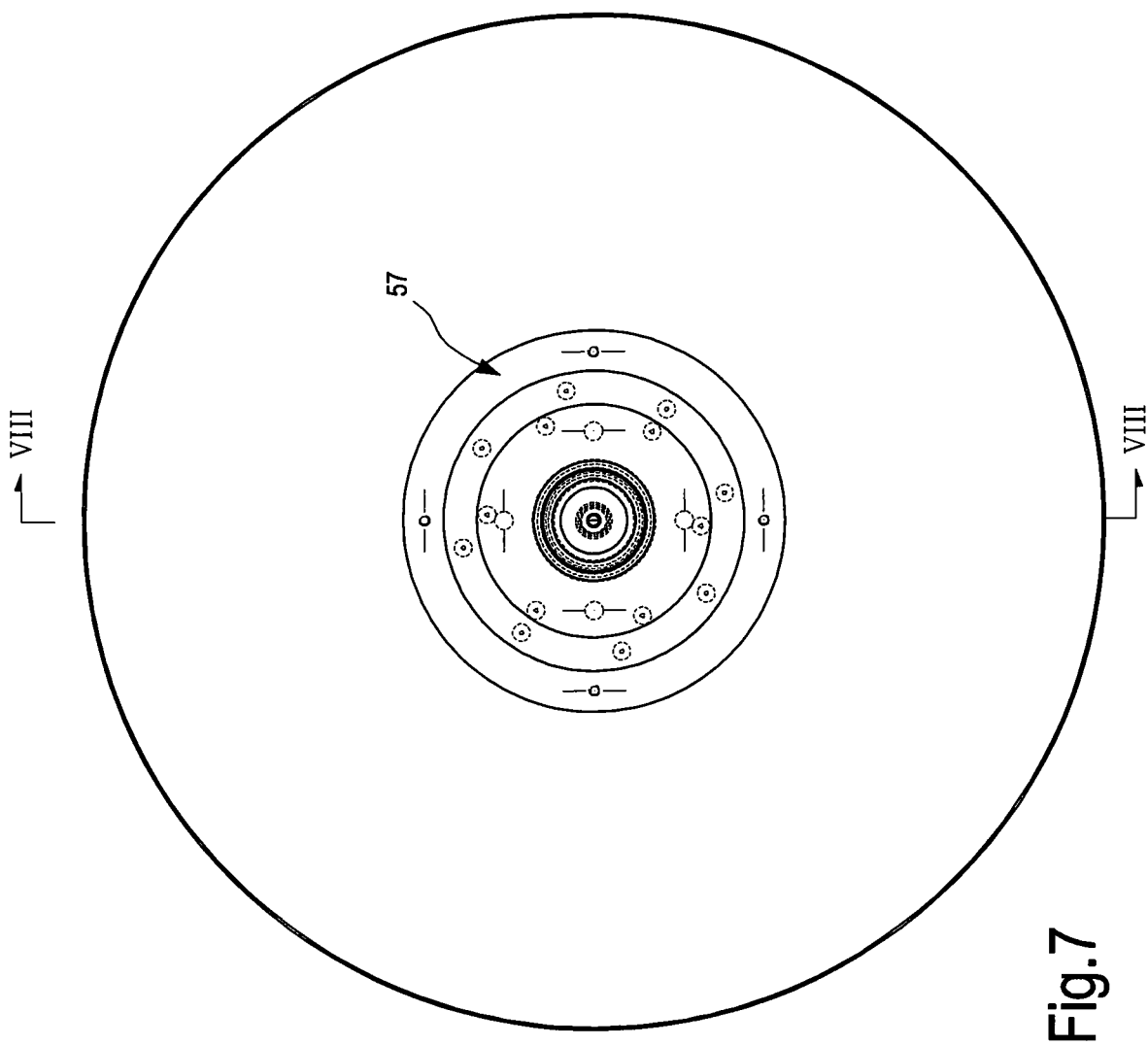

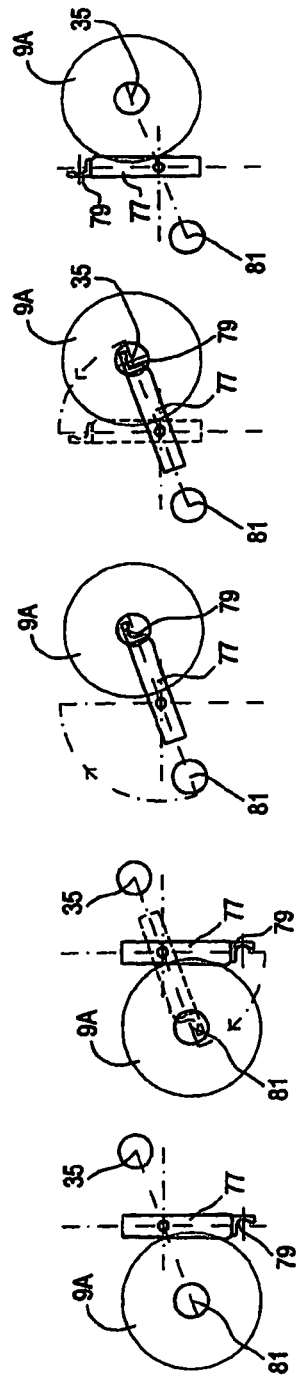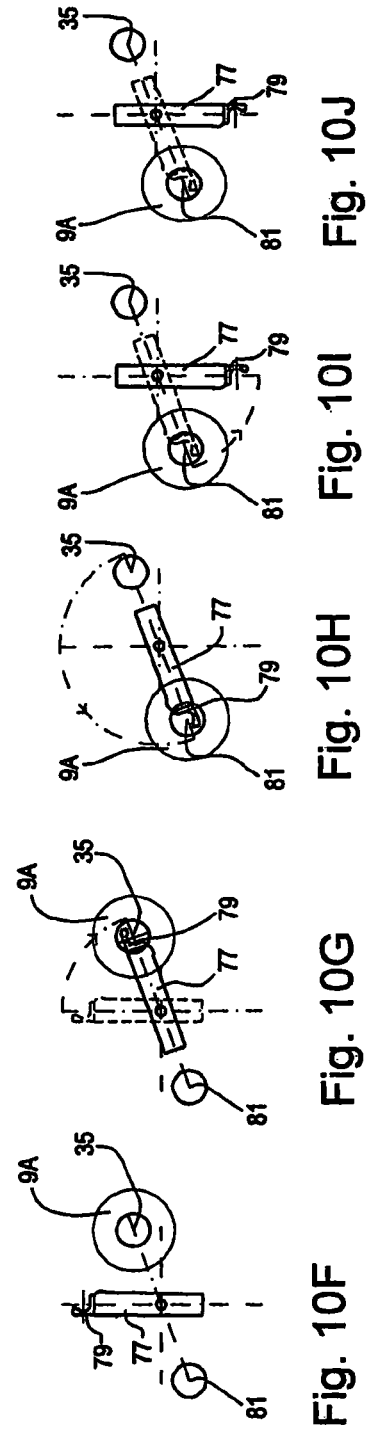

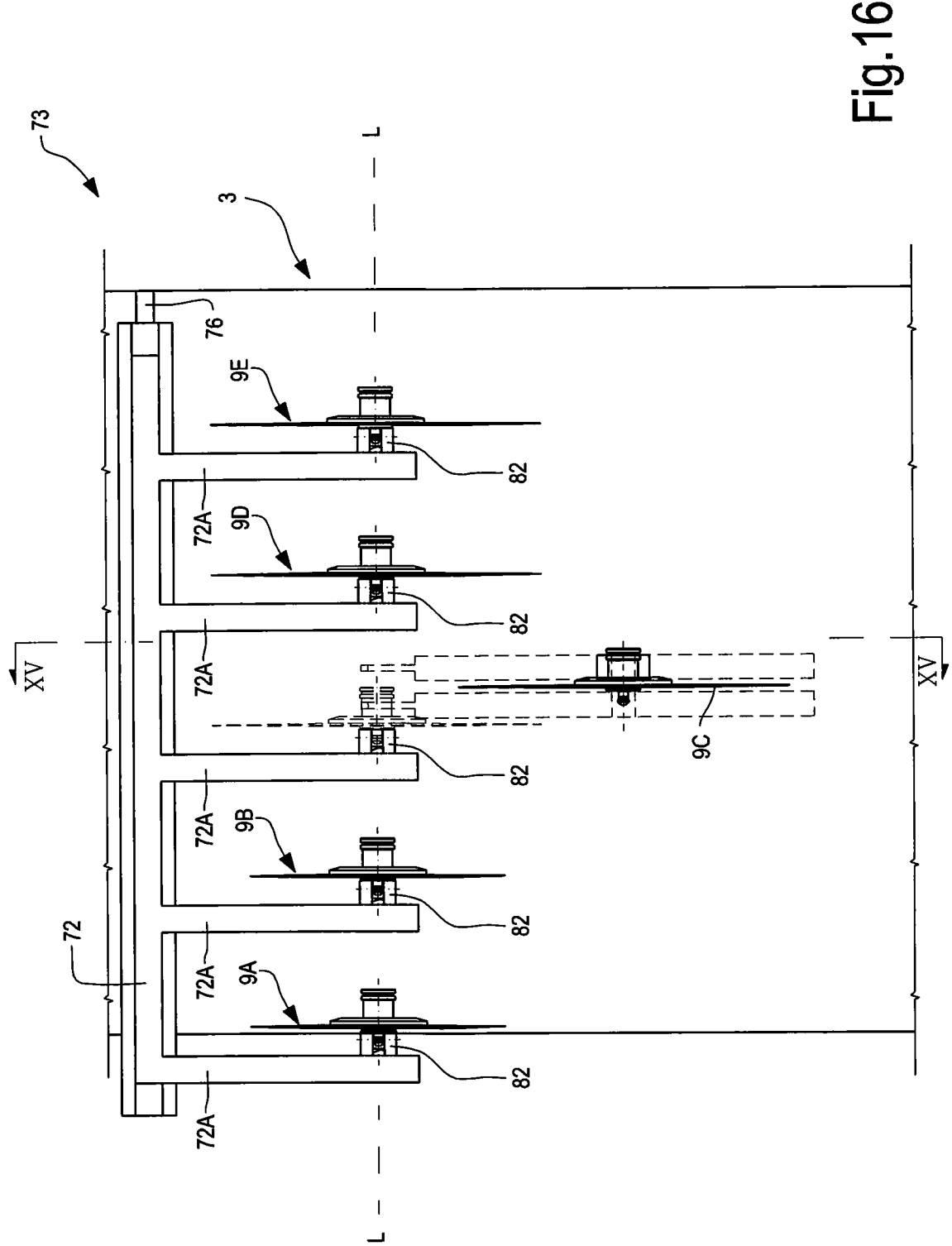

METHOD AND MACHINE FOR CUTTING LOGS OF WOUND WEB MATERIAL

RELATED APPLICATION

This is a continuation of U.S. Ser. No. 15/507,089 filed Feb. 27, 2017, which is the United Stated National phase of International Application No. PCT/EP2015/067518, filed Jul. 30, 2015 and published as WO 2016/030124 A1. Each of the above-identified applications are incorporated herein in their entirety by reference.

TECHNICAL FIELD

The present invention relates to the field of machines for processing logs of web material, in particular, but without limitation, logs of paper, such as, although without limitation, tissue paper or the like for producing toilet paper, kitchen towels and the like.

BACKGROUND ART

In many industrial fields for the production of rolls of wound web material, logs of significant axial dimensions are produced, and are subsequently cut into smaller rolls, i.e. into rolls of smaller axial dimension destined for packaging and selling. Typical examples of this kind of processing are in the field of tissue paper converting, for producing rolls of toilet paper, kitchen towels and the like. In this field, plies of cellulose material are produced by means of continuous machines and wound into so-called parent reels. These reels are then unwound and rewound in rewinding machines, to form logs, whose axial length corresponds to the width of the ply produced by the paper mill and is equal to a multiple of the axial length of the products to be marketed.

Then, cutting machines are used to divide the logs into rolls of smaller axial dimensions, destined for packaging and consumption. Examples of cutting machines of this type are described in U.S. Pat. Nos. 6,786,808 and 5,522,292. Cutting machines for logs of wound web material, especially tissue paper, typically comprise a feeding path for the logs to be cut and a cutting head arranged along the feeding path. The cutting head comprises one or more disc-shaped cutting blades, that rotate around their axis and are also provided with a cyclical movement—for example, rotating or oscillating movement—to cut sequentially the logs of greater axial dimensions, fed along the feeding path, into single sequential rolls.

The disc-shaped cutting blades are subject to wear and therefore require to be often ground. When it is ground, the disc-shaped cutting blade is gradually eroded, with a consequent reduction of its diameter. When the minimal diameter dimension is achieved, the disc-shaped cutting blade shall be replaced.

Replacing the disc-shaped cutting blade is a very dangerous operation for the operator, due to the sharp circumferential edge of these tools, that are also bulky and heavy and therefore difficult to be handled. For replacement, the cutting machine shall be stopped and the operator shall access the inside of the machine to reach the cutting head that is in a narrow area difficult to be accessed, where the narrow space and the presence of numerous mechanical members make the operations difficult. This increases the risk that the operator hurts himself with the sharp edge of the disc-shaped cutting blade. The operations require great carefulness and long shutdown times.

The cutting machines are arranged in an intermediate position along a very long and complex paper converting line, comprising several stations or operating machines. Along the converting line one or more unwinding machines are typically arranged, feeding one or more plies of cellulose material to a rewinding machine downstream of the unwinding machines along the converting line. The rewinding machine produces the logs that shall be subsequently cut. Downstream of the rewinding machine a gluer is arranged, that glues the tail end of the logs to allow subsequent processing, such as the cutting. The logs produced by the rewinding machine and glued by the gluer are sequentially fed to the cutting machine. Usually, one or more storage units are arranged between the rewinding machine and the gluer and/or between the gluer and the cutting machine; in these storage units logs can be accumulated to allow a change in the production speed of the single machines along the converting line.

Despite the storage units, the time necessary to replace the disc-shaped cutting blades in the cutting machines for logs of cellulose material are so long that the machines upstream thereof cannot work continuously. This is due to the fact that, the amount of logs produced during the time necessary for safe replacement of a disc-shaped cutting blade in a cutting machine (during which the cutting machine is therefore idle) is greater than the amount that can be stored in the storing unit(s) upstream. It is therefore necessary to stop the machines upstream of the cutting machine. In fact, changing the disc-shaped cutting blades requires 20-30 minutes of an expert operator, and this time increases if the operator is not very expert. The replacement of the disc-shaped blade does not always require the same time; it is not therefore possible to program the shutdown of the cutting machine for a given preset time The shutdown of the machine results into production loss and this affects the production cost per unit and, therefore, the production line profitability.

Moreover, the stop or slowing down of the machines downstream of the cutting machine during the replacement of the disc-shaped cutting blades are transitory periods that affect the correct operation of the machine and can cause problems or alterations in the quality of the finished product. For example, gluers can be subject to glue drying with consequent blockage, while rewinding and unwinding machines are subject to dynamic stresses during acceleration and deceleration. The web material can be subject to side sliding or other troubles in the feeding speed, resulting in wrinkles on the finished product, which affects the quality of the rolls exiting the converting line.

There is therefore a need to improve the known cutting machine as regards the replacement of the cutting tools or knives, i.e. of the disc-shaped cutting blades.

SUMMARY OF THE INVENTION

According to one aspect, to solve or limit one or more of the drawbacks of the prior art, a method is provided to cut logs of wound web material comprising the steps of:
  providing a feeding path for the logs to be cut;
  arranging along the feeding path a cutting head with at least one disc-shaped cutting blade, the cutting head moving the disc-shaped cutting blade with a cyclical motion to cut the logs and allow a forward movement of the logs along the feeding path;
  providing at least one store unit for disc-shaped cutting blades associated with the cutting head;

moving logs of web material sequentially along the feeding path in a direction parallel to the log axis;
cutting the logs by means of the disc-shaped cutting blade mounted on the cutting head and dividing the logs into small rolls having an axial length smaller than the logs;
periodically grinding the disc-shaped cutting blade;
when the disc-shaped cutting blade has so worn that must be replaced: temporarily stopping the forward movement of the logs; removing the worn disc-shaped cutting blade from the cutting head; taking a new disc-shaped cutting blade from the store unit and transfer it to the cutting head;
once the new disc-shaped cutting blade has been mounted on the cutting head, re-start the forward movement of the logs along the feeding path.

The disc-shaped cutting blades can be taken from the store unit, installed on the cutting head and removed from the cutting head by means of a same handling member, which can be associated, to this end, with the store unit for the disc-shaped cutting blades. In other embodiments two or more distinct handling members can be provided, to perform the different operations of replacement of the disc-shaped cutting blades. For example, a first handling member can be provided to take the disc-shaped cutting blade from the store unit and install it on the cutting head, and a second handing member can be provided to remove the worn disc-shaped cutting blade from the cutting head. The, or each, handling member can comprise one or more elements, devices or components, the blade being transferred from one element, device, or component, to the other.

In some embodiments, the method provides the step of putting the worn disc-shaped cutting blade into the store unit, which can therefore have an adequate number of seats for corresponding disc-shaped cutting blades. It is also possible to put the worn disc-shaped cutting blades in a different area, for example into a second store unit for worn blades, separate and distinct from the store unit containing the new blades. In this case again, it is possible to provide only one handling member or, alternatively, two handling members.

The method defined above can be implemented so that the cutting head remains fixed when the worn cutting blade is taken and/or the new cutting blade is installed. Essentially, the movements are imparted only to the blade, while the head remains fixed or does not perform movement useful for the blade replacement.

A solution will be described in detail below, wherein the disc-shaped cutting blades are moved by means of only one handling member that installs and removes the blades. Moreover, only one storage unit is provided, from which the new disc-shaped cutting blades are taken and into which the worn disc-shaped cutting blades are put. This allows a particularly simple, economical and compact configuration, easy to be managed.

The use of two storage units, one for the new blades and the other for the worn blades, and/or two distinct handling members, one for the insertion of the new blades and the other for the removal thereof, makes the machine more complex and expensive, but can contribute to reduce the time necessary to replace the worn blades.

According to a further aspect, a cutting machine is provided for cutting logs of web material, comprising a feeding path for the logs to be cut and a cutting head arranged along the feeding path. The cutting head comprises a coupling for a disc-shaped cutting blade and is designed to impart the disc-shaped cutting blade a rotary motion around the axis thereof and a cyclic movement to cut the logs into single rolls and to allow the logs to move forward along the feeding path. The machine also comprises a store unit for disc-shaped cutting blades associated with the cutting head. At least one handling member is also provided to remove a worn disc-shaped cutting blade from the cutting head and replace the worn disc-shaped cutting blade with a new disc-shaped cutting blade taken from the store unit.

As mentioned above, in other embodiments more handling members can be provided, each of which is configured and arranged so as to perform one or more of the following operations: removing the worn disc-shaped cutting blade from the cutting head; transferring the worn disc-shaped cutting blade towards the store unit; putting the worn disc-shaped cutting blade into the store unit; taking a new disc-shaped cutting blade from the store unit; transferring the new disc-shaped cutting blade towards the cutting head; mounting the new disc-shaped cutting blade on the cutting head.

In some embodiments, the machine comprises only one storage unit for the disc-shaped cutting blades, inside which the new disc-shaped cutting blades are contained and into which the worn disc-shaped cutting blades are inserted. In other embodiments the machine can comprise a storage area and/or a second storage unit for storing the worn disc-shaped cutting blades.

Features and embodiments are described hereunder and further defined in the attached claims, which form an integral part of the present description. The above brief description identifies features of the various embodiments of the present invention, so that the detailed description below may be better understood and in order that the contributions to the art may be better appreciated. There are obviously other characteristics of the invention which will be described further on and which will be indicated in the attached claims. With reference to this, before illustrating different embodiments of the invention in detail, it must be understood that the various embodiments of the invention are not limited in their application to the construction details and to the arrangements of components described in the following description or illustrated in the drawings. The invention may be implemented in other embodiments and implemented in various ways. Also, it is necessary to understand that the phraseology and terminology used here are only for descriptive purposes and must not be considered as limiting.

Persons skilled in the art will therefore understand that the concept on which the invention is based may be promptly used as a base for designing other structures, other methods and/or other systems to implement the various objects of the present invention. It is therefore important that the claims be considered as comprising those equivalent constructions which do not deviate from the spirit and scope of the present invention.

In the detailed description below, a machine will be illustrated also having special innovative approach systems to move the grinding wheels towards the disc-shaped cutting blade, involved in each replacement of the disc-shaped cutting blade. It should be understood that, in other embodiments, these systems can be omitted, and the grinding wheel can be moved towards the blade manually. Vice versa, the approach systems for the grinding wheels can be also used in cutting machines without systems for automatic replacement of the worn blades.

BRIEF DESCRIPTION OF THE DRAWINGS

The invention shall now be more apparent by following the description and accompanying drawing which shows practical embodiments of the invention. More in particular, in the drawing:

FIG. 7 is a front view of a disc-shaped cutting blade installed on the support member;

FIG. 8 shows a diameter section according to VIII-VIII in FIG. 7;

Figure 11:
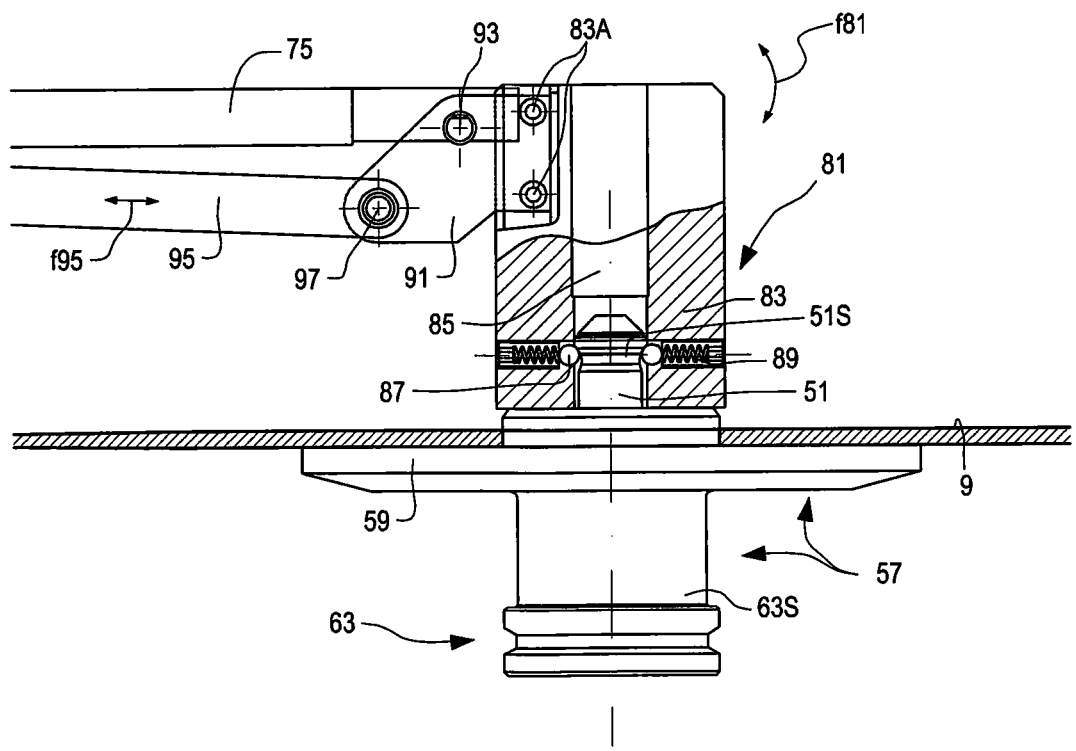
Figure 12:
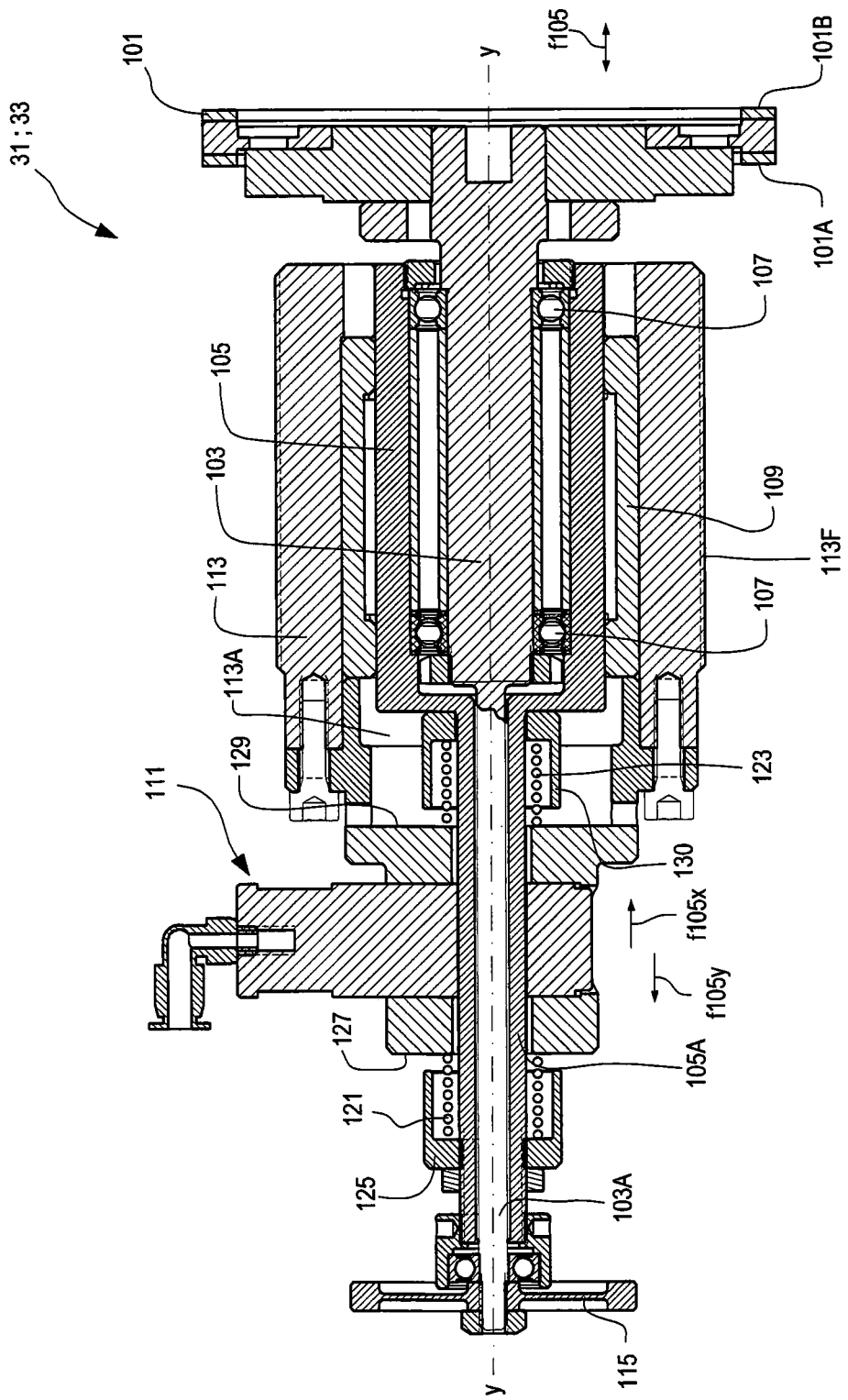
Figure 13:
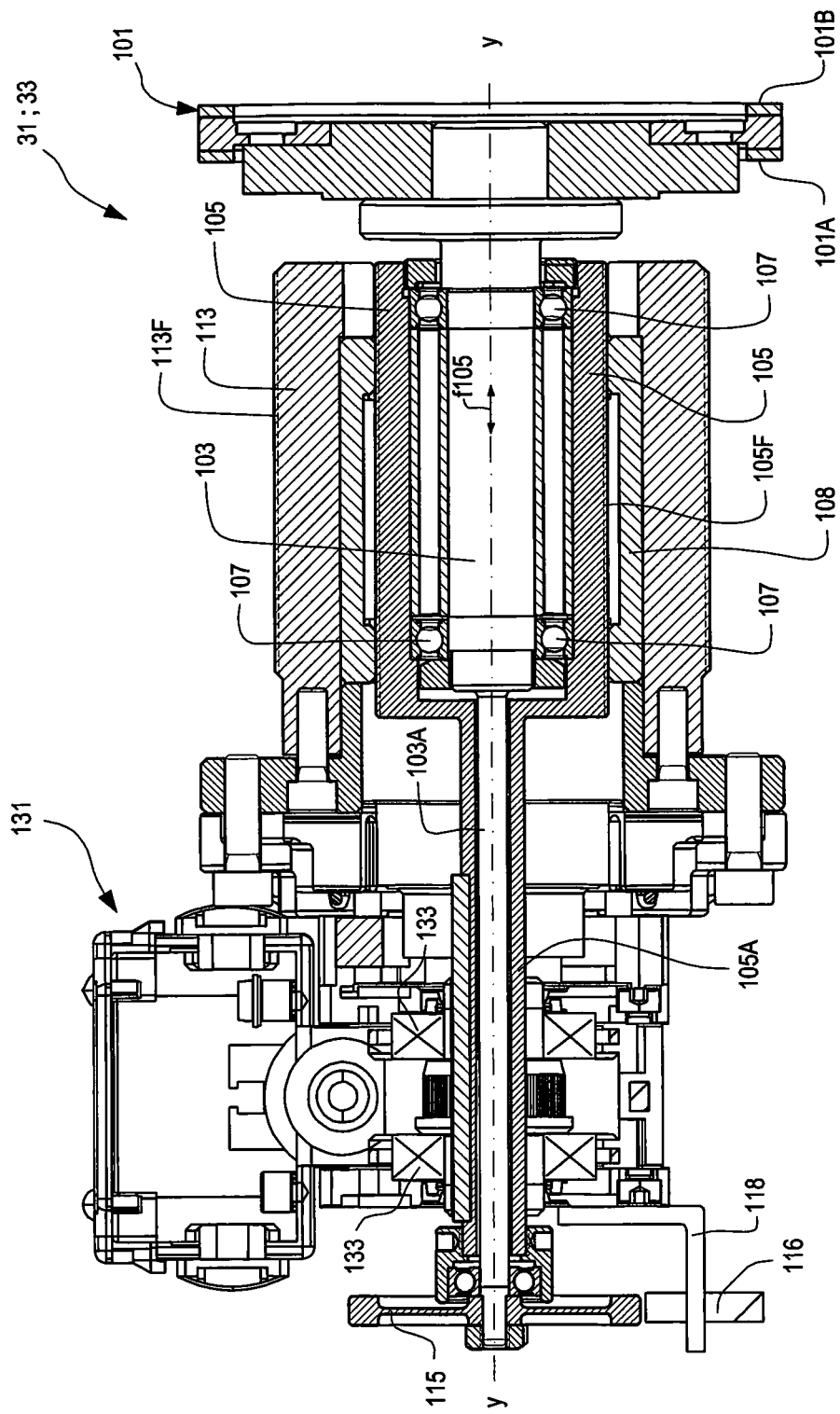
Figure 14:
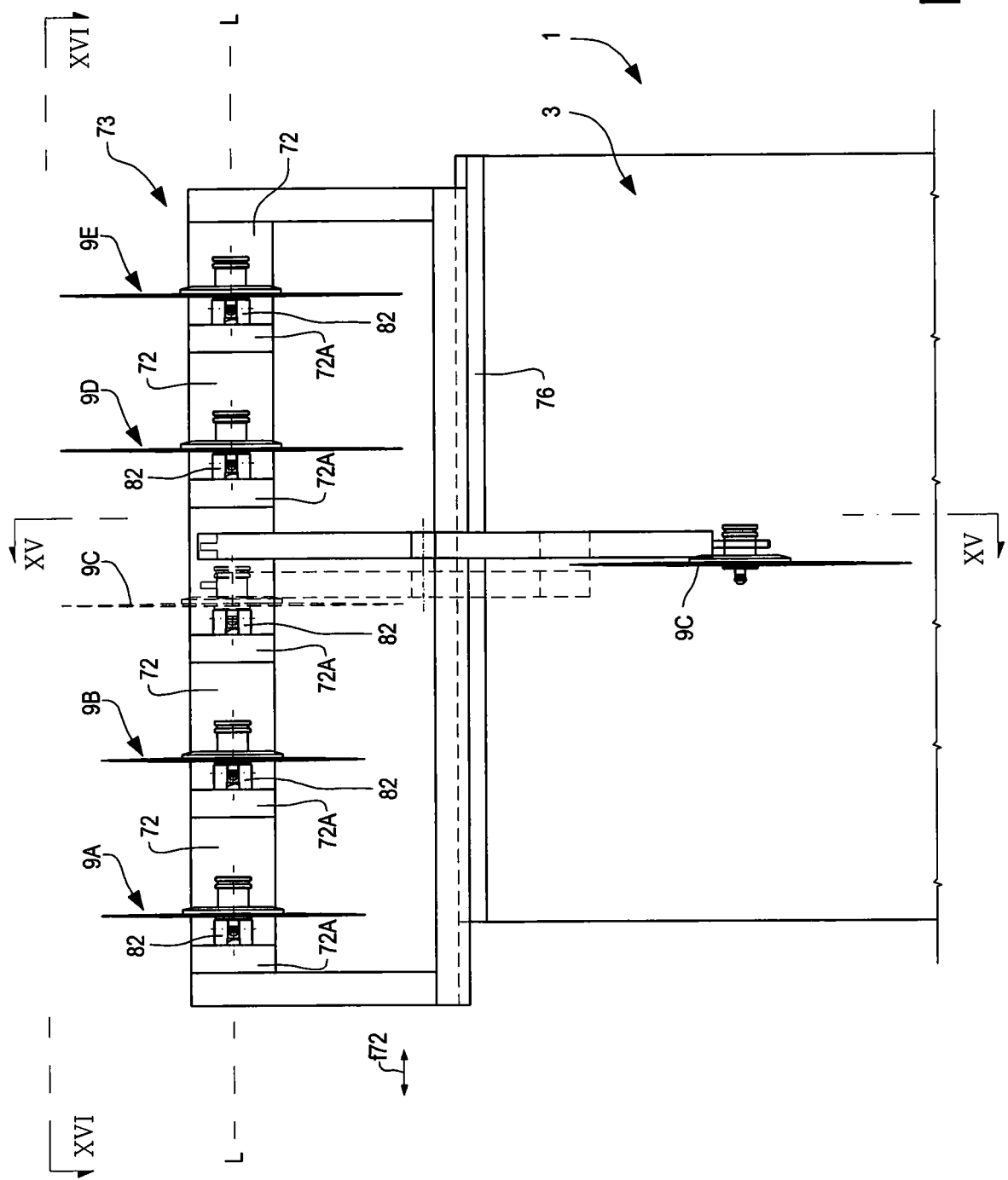
Figure 15:
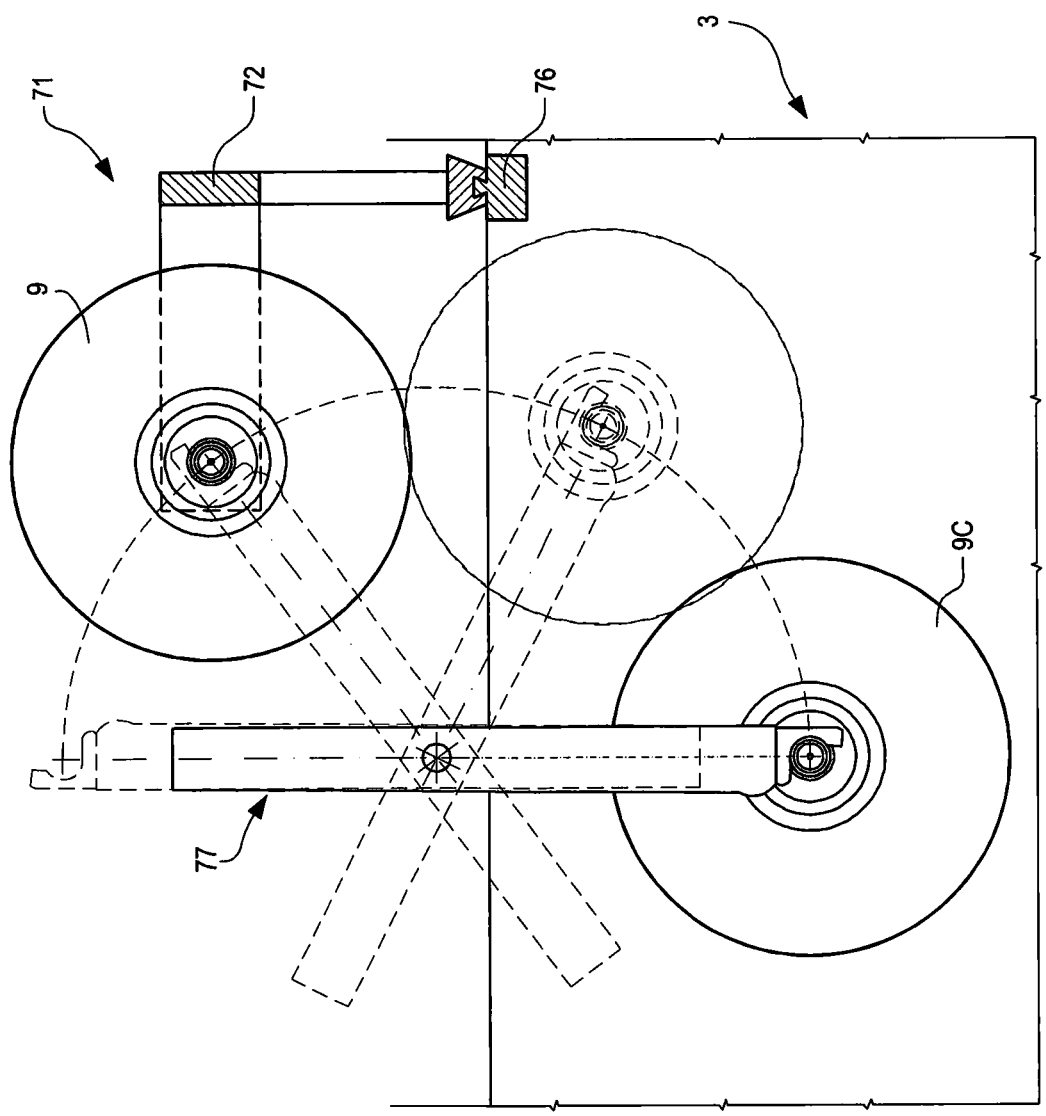

figures from 9A to 9O illustrate a sequence for mounting a disc-shaped cutting blade and a sequence for the replacement thereof;

FIGS. 10A to 10J show a schematic front view of the sequence for the replacement of a disc-shaped cutting blade;

FIG. 11 is a detail of a support for the disc-shaped cutting blades in the storage unit;

FIG. 12 is a longitudinal cross section of a grinding wheel and the respective controlled approach system to move the grinding wheel towards the disc-shaped cutting blade in a possible embodiment;

FIG. 13 is a longitudinal cross section of a grinding wheel and the respective controlled approach system to move the grinding wheel towards the disc-shaped cutting blade in a further possible embodiment;

FIG. 14 is a schematic side view of a cutting machine with a different structure of the storage unit;

FIG. 15 is a schematic front view according to XV-XV of FIG. 14 of the cutting blades and the blade moving systems; and FIG. 16 is a plan view according to XVI-XVI in FIG. 14.

DETAILED DESCRIPTION OF EMBODIMENTS

The detailed description below of the example embodiments is made with reference to the attached drawings. The same reference numbers in different drawings identify the equal or similar elements. Furthermore, the drawings are not necessarily to scale. Moreover, the detailed description below does not limit the invention. The protective scope of the present invention is defined by the attached claims.

In the description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular features, structures or elements can be furthermore combined in any adequate way in one or more embodiments.

Figure 1:
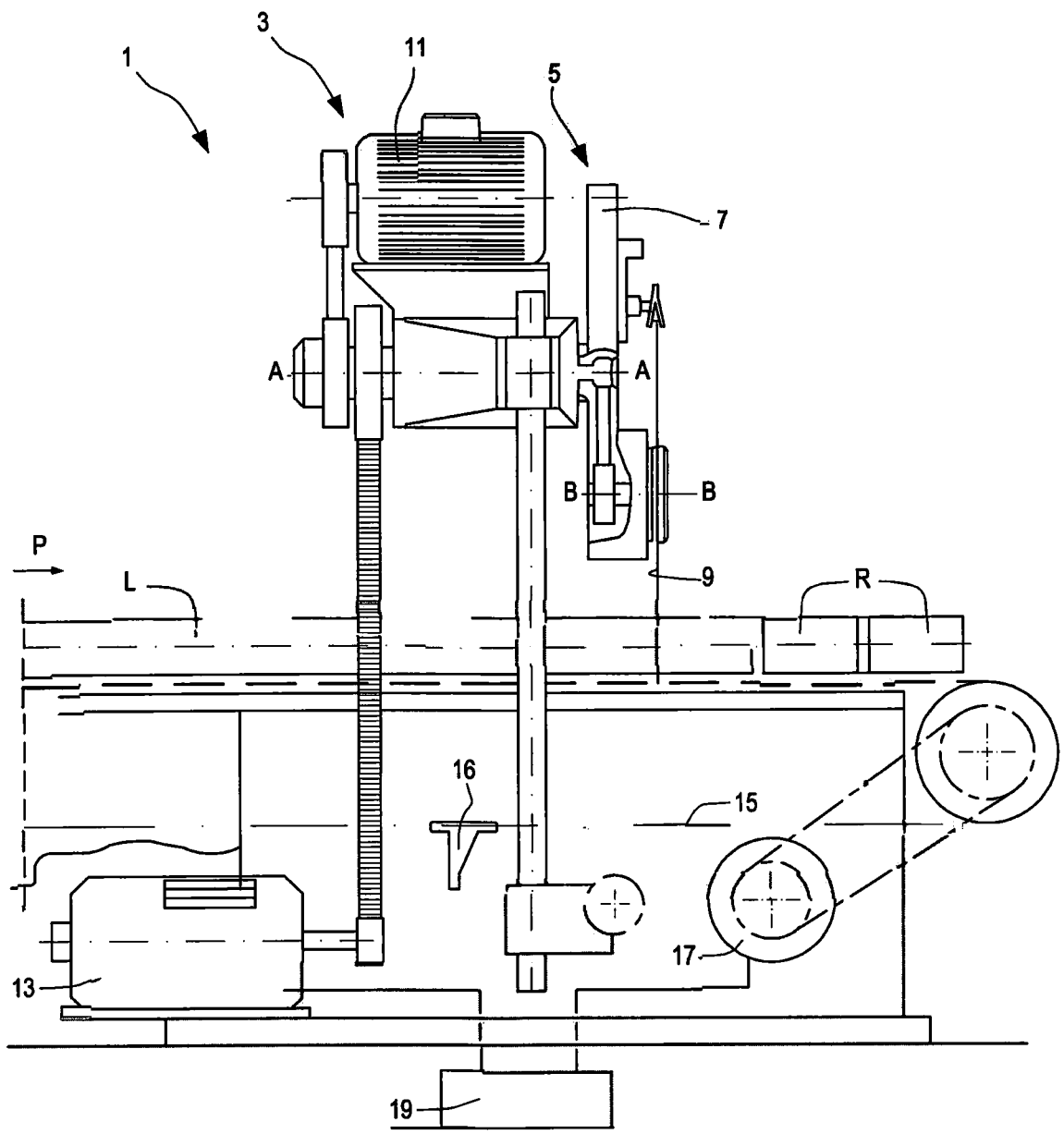
FIG. 1 is a partial schematic side view of the main members of an embodiment of a cutting machine.

FIG. 1 schematically illustrates the main members of a cutting machine 1, which can embody the present invention. It should be understood that the structure of the cutting machine can be different from that briefly described herein. For instance, different drive means can be provided for transmitting the feeding motion of the logs and the disc-shaped cutting blade. This latter can be provided with reciprocating motion, for instance an oscillating motion, instead of a continuous motion. Moreover, the cutting head of the cutting machine can comprise more disc-shaped cutting blades.

The cutting machine 1 illustrated herein comprises a feeding path schematically indicated with P, along which the logs L, that shall be cut into rolls R of smaller axial dimension, move forward. The rolls are then fed to packaging machines, not shown. The cutting machine is arranged downstream of a rewinding machine and of further processing stations, not shown and known to those skilled in the art.

In some embodiments, the cutting machine 1 comprises a cutting station 3, which in turn comprises a cutting head schematically indicated with number 5. The cutting head 5 can comprise an orbital head 7 rotating around the rotation axis A-A, which can be usually oriented nearly in the same direction as the feeding path P for the logs L to be cut. The orbital head 7 of the cutting head 5 carries at least one disc-shaped cutting head 9, which can rotate around its rotation axis B-B. The rotation axis B-B of the disc-shaped cutting blade 9 can be usually oriented nearly in the direction of the axis A-A. As known by those skilled in the art, there are cutting machines where the axes A-A and B-B are not perfectly parallel to each other and/or to the feeding direction along the feeding path P for the logs to be cut. This is due to some features of the cutting machine that are not relevant to the present description and relate to the relative movements between the cutting head 5 and the forward movement of the logs L to be cut.

The cutting machine 1 can comprise a motor 11 providing the disc-shaped cutting blade 9 with the rotary motion, and a further motor 13, providing the cutting head 5 and the orbital head 7 with the rotary motion around the axis A-A.

The logs L can move forward according to the feeding path P along one or more channels parallel to one another, so as to cut simultaneously more logs and increase the productivity of the cutting machine 1, as known by those skilled in the art.

The forward movement of the logs L can be provided, for instance, by means of a continuous flexible member 15, such as a chain or a belt, driven by a motor 17. Advantageously, the motors 11, 13, and 17 can be controlled by a central control unit 19, in a manner known to those skilled in the art and not described in greater detail.

The flexible member 15 can comprise pushers 16 arranged at preferably regular intervals along the extension of the flexible member 15, to push each single log L along the feeding path P through the cutting station 3.

In some embodiments, the forward movement of the logs can be continuous, at constant or variable speed. In other embodiments, the forward movement can be intermittent. During stops, the log is cut by the disc-shaped cutting blade 9. The orbital head 7 and/or the disc-shaped cutting blade 9 can have a forward and backward movement along the path P to cut the log L while it moves along the feeding path P without stopping, as known to those skilled in the art. In some embodiments, holding elements can be provided; they close during the cutting step to hold the log, thus ensuring a better cut quality, and open when the log shall move forward. The holding elements are preferably two: one upstream of the cutting plane, to hold the log, and one downstream of the cutting plane, to hold the part of the log that is cut to form a roll.

Figure 2:
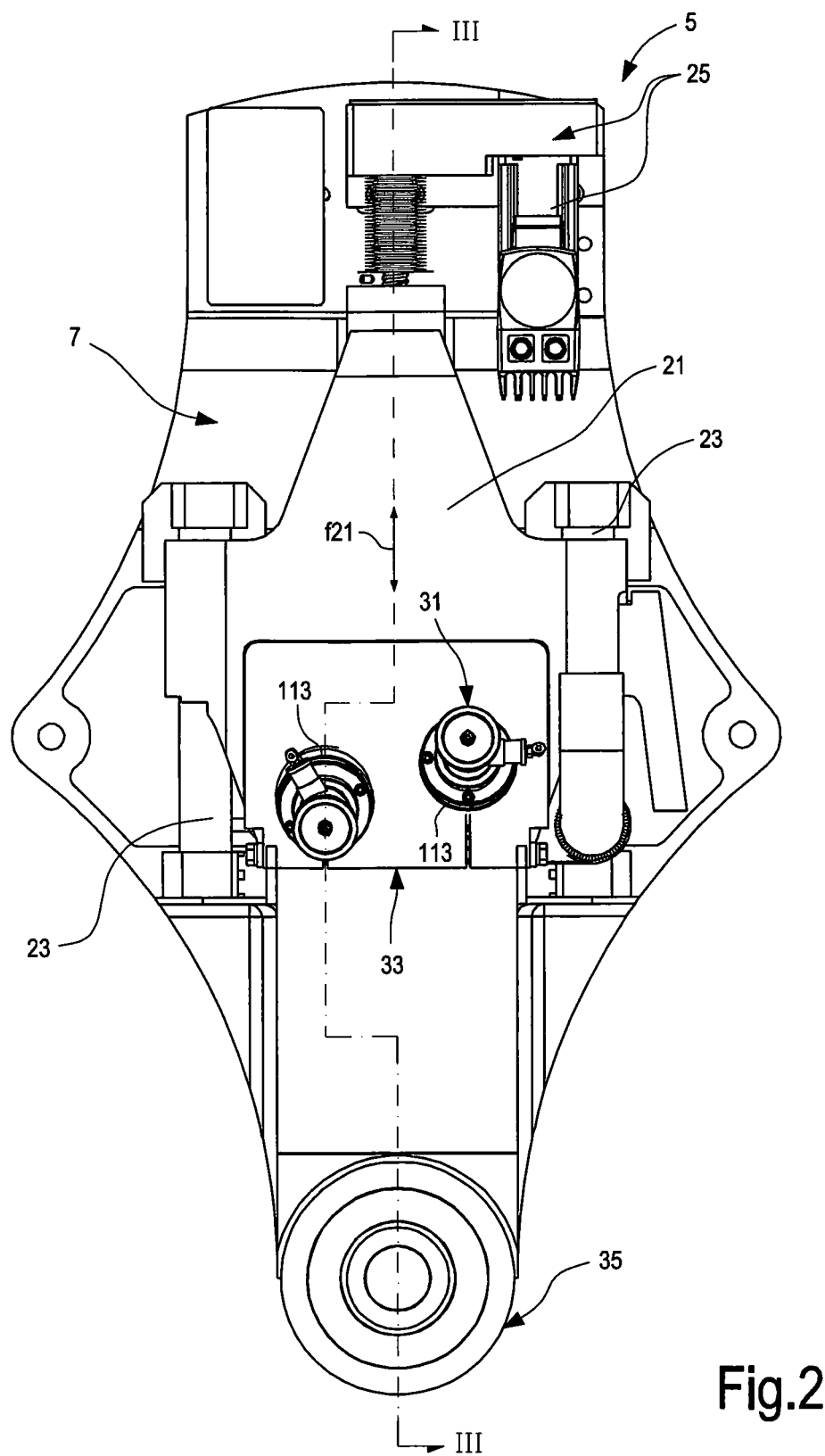
FIG. 2 is a front view of a cutting head.
Figure 3:
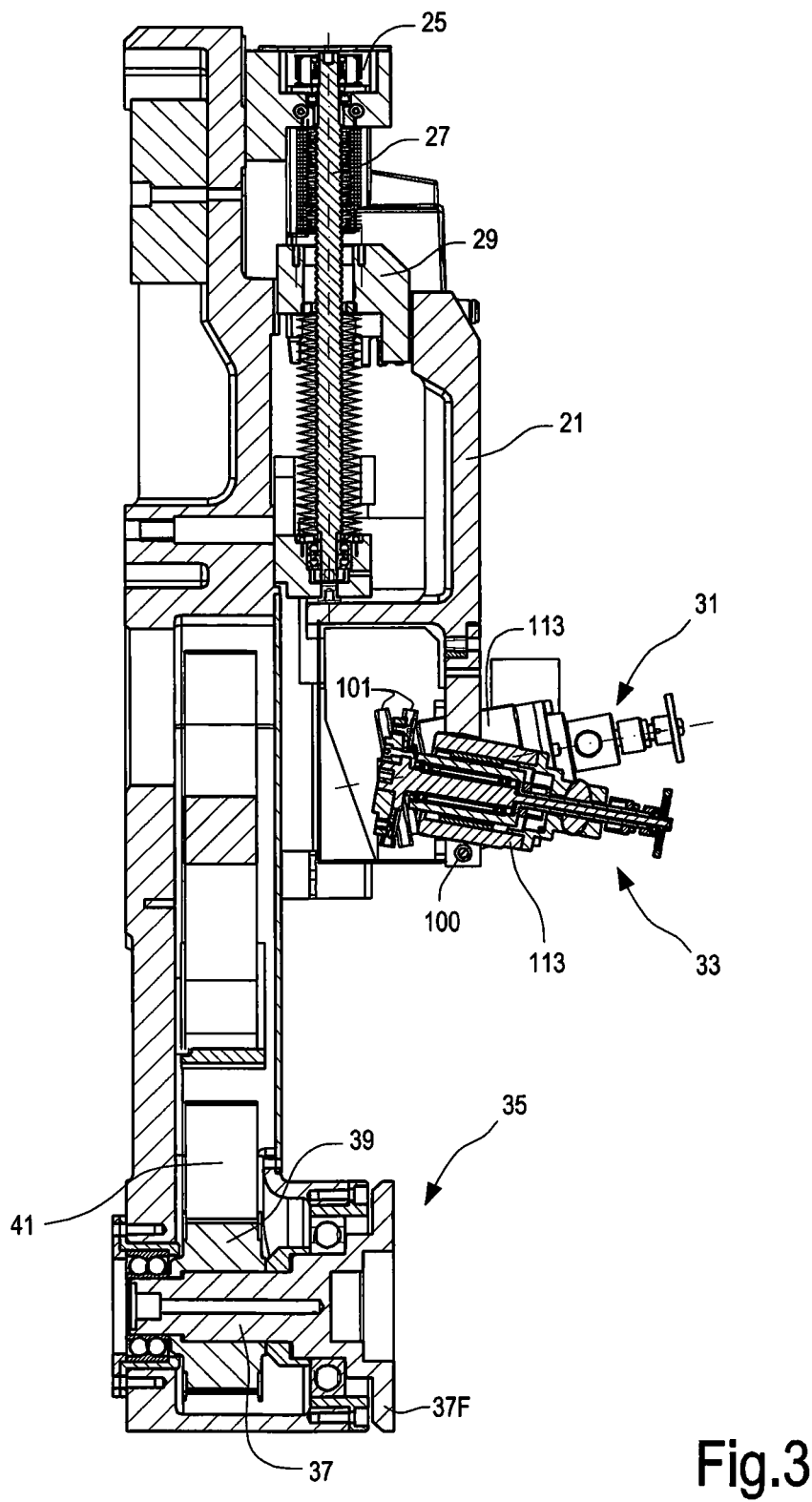
FIG. 3 shows a section according to in FIG. 2.

FIGS. 2 and 3 illustrate an embodiment of the cutting head 5 and, especially, of the orbital head 7.

In this embodiment, the cutting head 5 comprises a slide 21 mounted on the orbital head 7 so as to move according to the double arrow 21 for the purposes that will be better described below. In some embodiments, the slide 21 is guided on guides 23 carried by the orbital head 7. A gear motor 25 moves the slide 21 according to the double arrow f21. The motion can be transmitted by means of a system with threaded bar 27 and nut screw 29, for instance a recirculating ball screw. The nut screw 29 can be fastened to the slide 21.

In advantageous embodiments, two grinding units, indicated with 31 and 33, can be arranged on the slide 21. As it will described in greater detail below, each grinding unit 31, 33 comprises a respective grinding wheel for grinding the disc-shaped cutting blade 9, and a controlled approach system to move the respective grinding wheel towards the cutting edge of the disc-shaped cutting blade, for purposes that will be explained below. The grinding wheels are arranged so that each of them grinds one of the two flanks of a cutting edge of the disc-shaped cutting blade 9. The two grinding wheels of the two grinding units 31, 33 can be equal to each other, for instance when the disc-shaped cutting blade is symmetrical with respect to its median plane. However, this is not necessary, but only preferred in some embodiments. As known, in some embodiments, the disc-shaped cutting blade 9 can have an asymmetrical edge. In this case, the grinding wheels of the two grinding units can be different from each other and/or they can be adjusted differently from each other.

Moreover, the cutting head 5 comprises a coupling for the disc-shaped cutting blade 9, indicated as a whole with number 35. The coupling 35 will be described in greater detail below, with reference to FIG. 4 and to FIGS. 5-8.

The coupling 35 can comprise a mandrel or rotary shaft 37, driven into rotation by a toothed wheel or pulley 39, around which a toothed belt 41 can be driven, controlled by a motor 11 or other suitable mover, not shown in detail.

Figure 4:
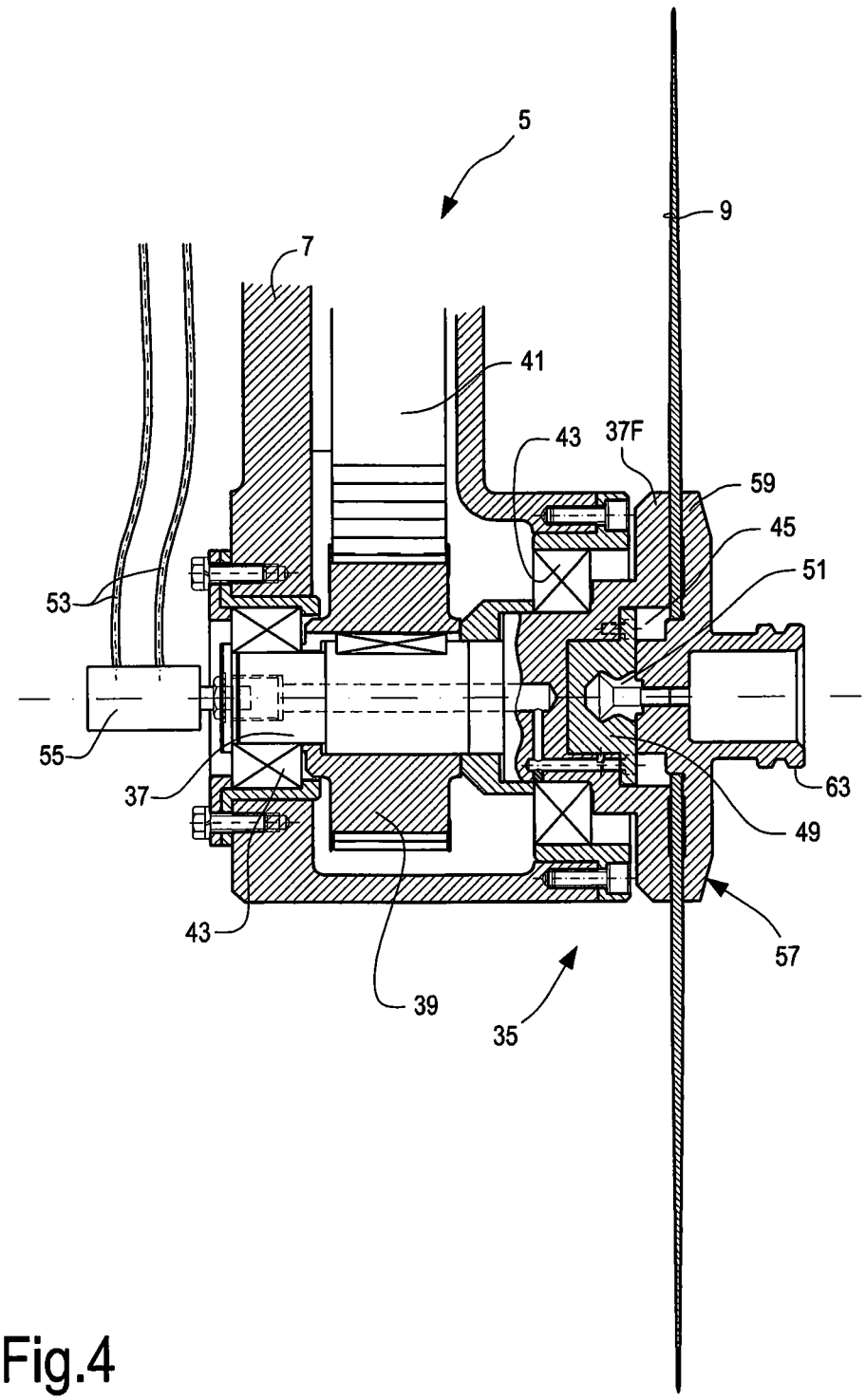
FIG. 4 is an enlarged section of the chuck for the disc-shaped cutting blade, arranged onto the cutting head of FIGS. 2 and 3.

FIG. 4 shows an enlarged section of the coupling 35 for coupling the disc-shaped cutting blade 9 to the cutting head 5, while FIGS. 5-8 show details of the disc-shaped cutting blade and of the support member thereof, allowing automatic replacement thereof by means of a handling member that takes the disc-shaped cutting blades from a store unit, described below and associated with the cutting machine 1. The replacement of the disc-shaped cutting blades 9 will be described in detail below with reference to FIGS. 9 and 10.

In the schematic image of FIG. 4, bearings 43 are shown, supporting the shaft or mandrel 37. This latter is provided with a seat 45, where a known holding device 49 is inserted, to lock a shaft 51 with which the disc-shaped cutting blade 9 can be provided, as better described with reference to FIGS. 5-8. Opening and closing of the holding device 49 are controlled by means of a pressurized fluid, for example oil or air, fed through ducts 53, and a rotating distributor 55 through the shaft 37.

In some embodiments, the shaft 37 has a front flange 37F, against which the disc-shaped cutting blade 9 is locked as described below.

Figure 6:
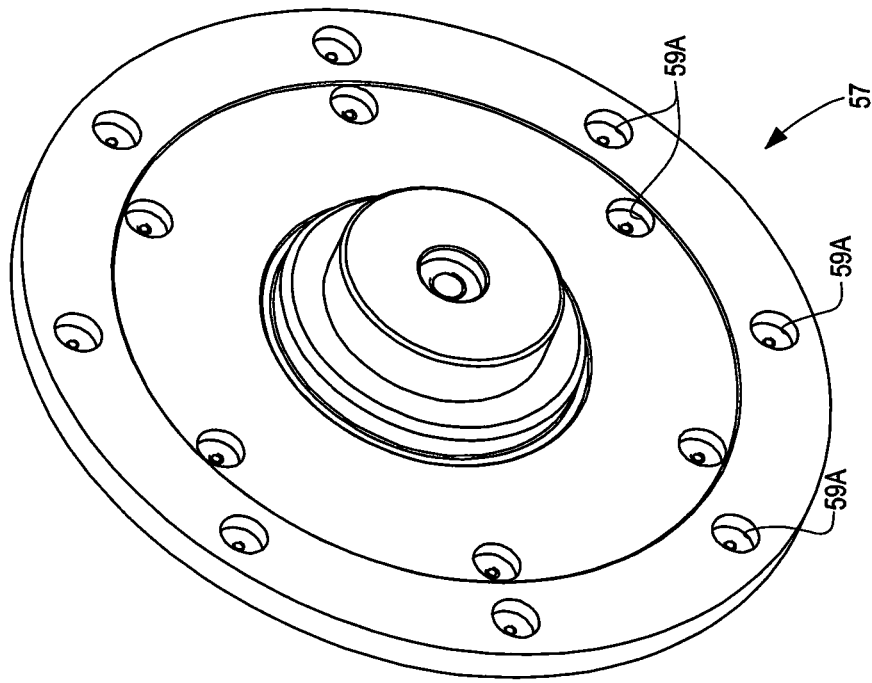
FIG. 6 is an axonometric view of the support member of FIG. 5.
Figure 5:
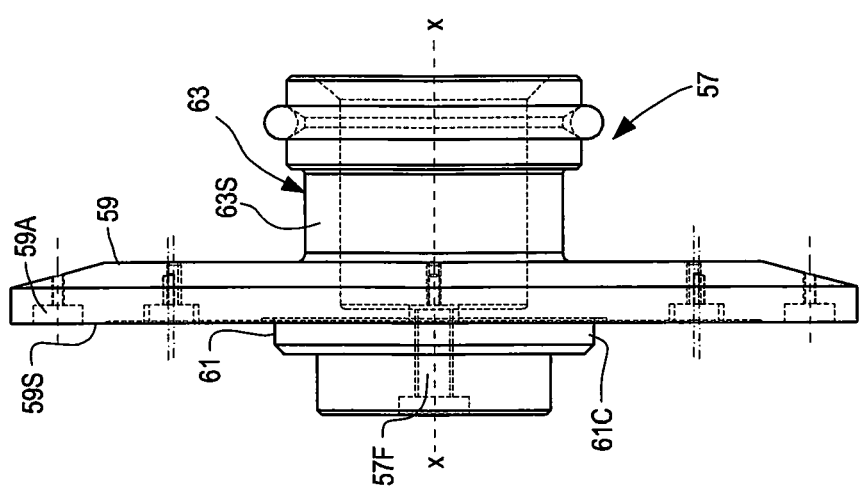
FIG. 5 is a side view of a support member for the disc-shaped cutting blade.

The shaft 51 of the disc-shaped cutting blade 9 can be part of a support member 57, shown in isolation in FIGS. 5 and 6 in a side and in an axonometric view, respectively. In FIGS. 5 and 6, the support member 57 is devoid of the shank 51 that can be screwed in a threaded hole 57F of the support member 57, for instance.

In some embodiments, the support member 57 has a flange 59 with a front surface 59S for contacting the disc-shaped cutting blade 9 and, more in particular, the face of the disc-shaped cutting blade 9 that is opposite to the face that, when mounted on the cutting head 5, is in contact with the flange 37F of the shaft 37.

In some embodiments, the support member 57 has a projection 61, where the threaded hole 57F is provided for fastening the shank 51. The projection 61 has an annular collar 61C entering a through hole of the disc-shaped cutting blade 9, as shown in FIG. 4 and FIG. 8.

In some embodiments, the support member 57 has a further central projection 63, extending from the flange 59 on the opposite side with respect to the shank 51. The projection 63 can be used, as it will be clear below, to engage the disc-shaped cutting blade 9, to which the support member 57 is fastened, and to move the disc-shaped cutting blade 9 from a storage unit to the cutting head 5 and vice versa.

In some embodiments, the projection 63 has an annular groove 63S, configured to be engaged by a handling member described below.

The coupling 35 and the support member 57 with the shank 51 associated with the disc-shaped cutting blade 9 are useful to replace the disc-shaped cutting blade 9 with a new one, that can be housed in a storage unit combined with the cutting machine 1, by means of a handling member allowing automatically to install a first disc-shaped cutting blade onto the cutting head 5 and, when the working disc-shaped cutting blade is worn, to replace it with subsequent disc-shaped cutting blades housed in the storage unit. The operation of the handling member during the replacement of the disc-shaped cutting blade 9 will be described in detail below with reference to the sequence of FIGS. 9A-9O and of FIGS. 10A-10J.

In some embodiments, the flange 59 of the support member 57 has seats 59A distributed around the axis X-X of the support member 57, inside which permanent magnets (not shown) can be inserted co-acting with the disc-shaped cutting blade 9. The magnets inserted in the seats 59A hold the disc-shaped cutting blade 9 on the support member 57 by magnetic attraction, when the disc-shaped cutting blade 9 is not fixed by means of the shank 51 to the coupling 35 of the cutting head 5, for example when the disc-shaped cutting blade is housed in the storage unit.

Figure 9A:
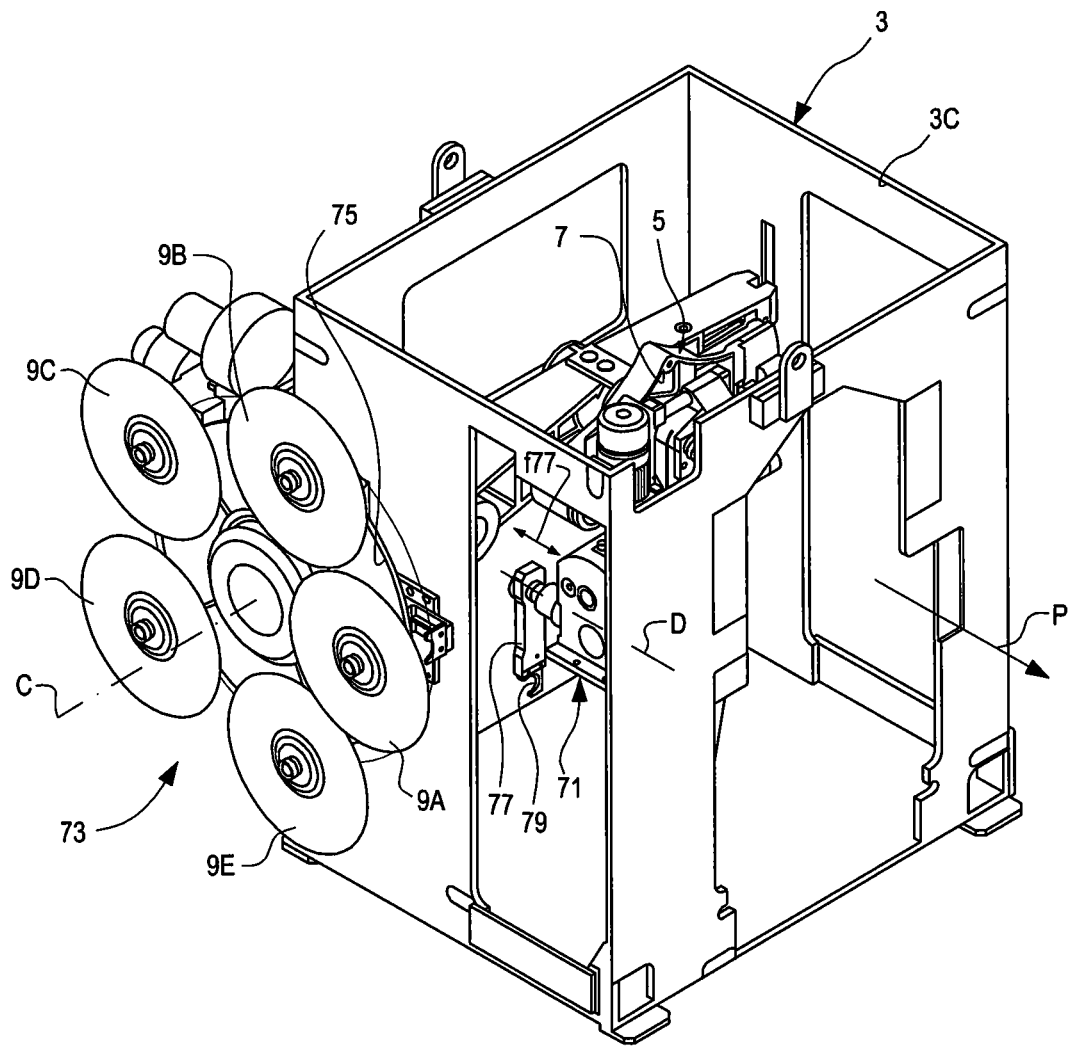
Figure 9B:
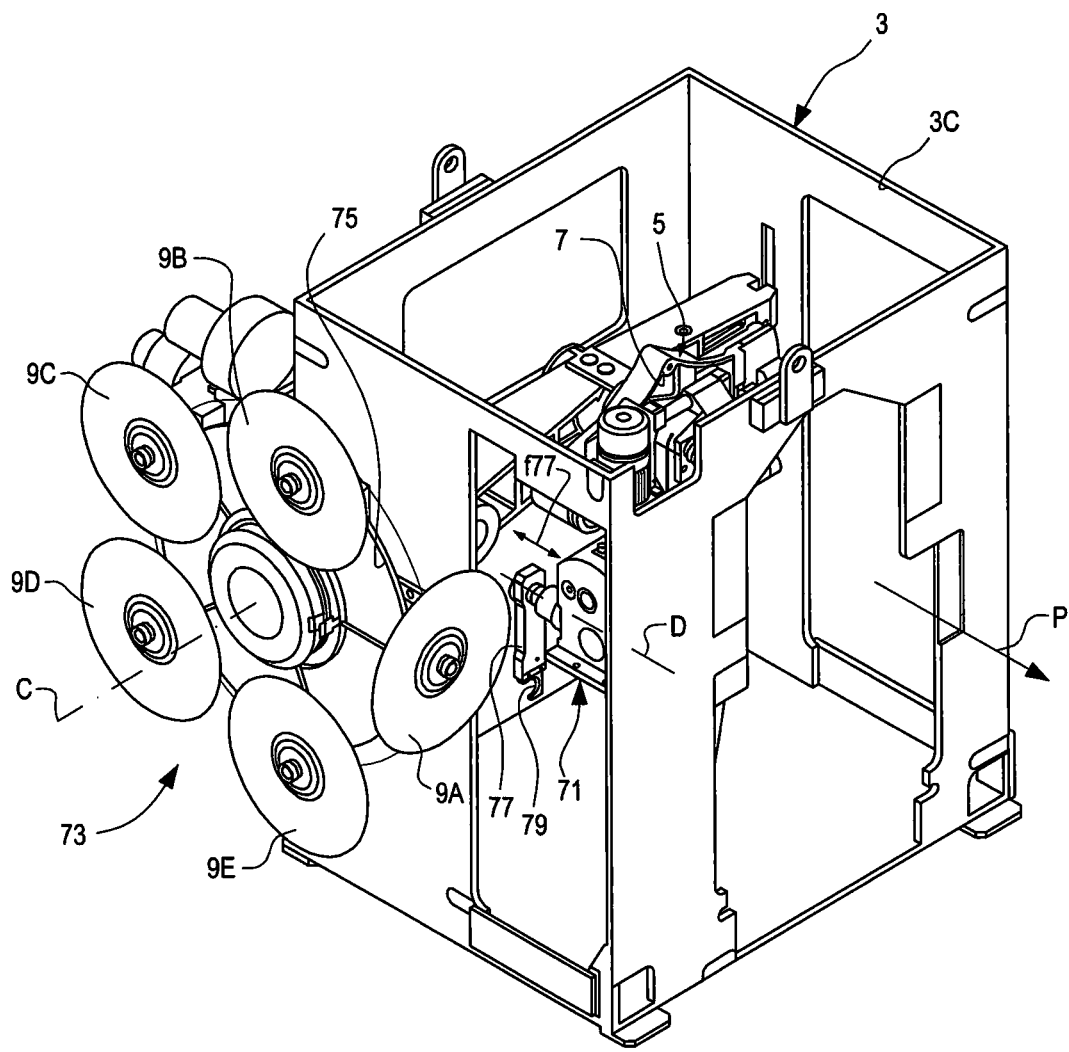
Figure 9C:
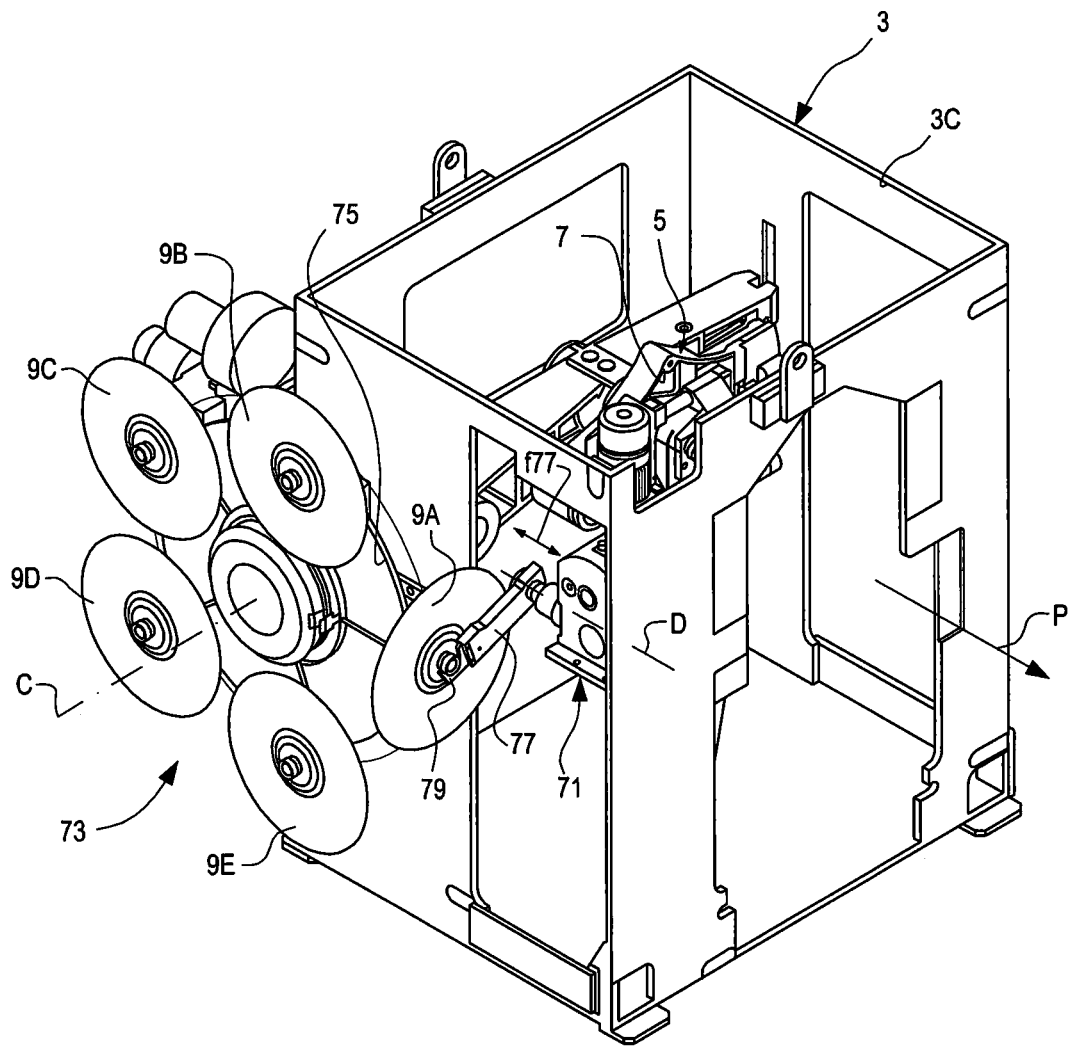
Figure 9D:
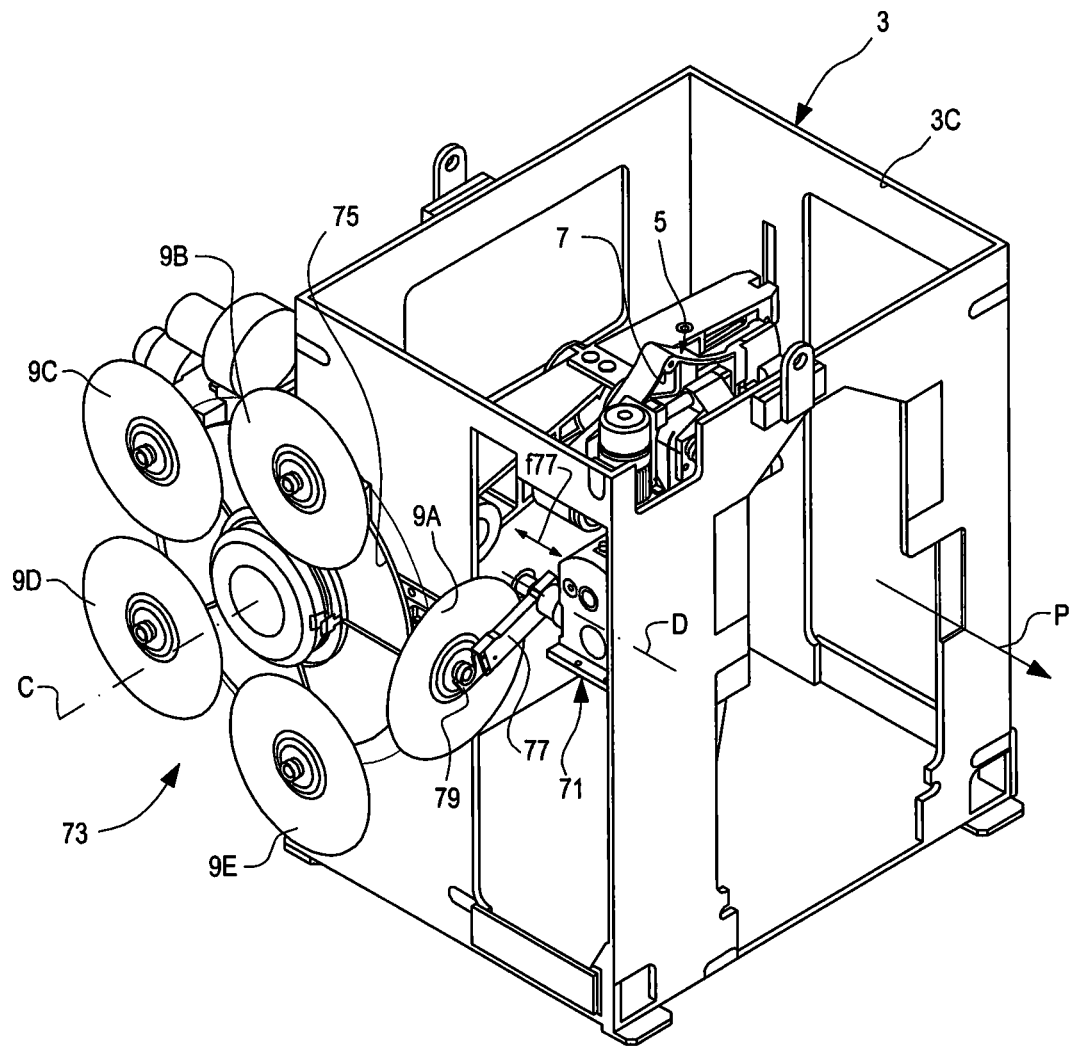
Figure 9E:
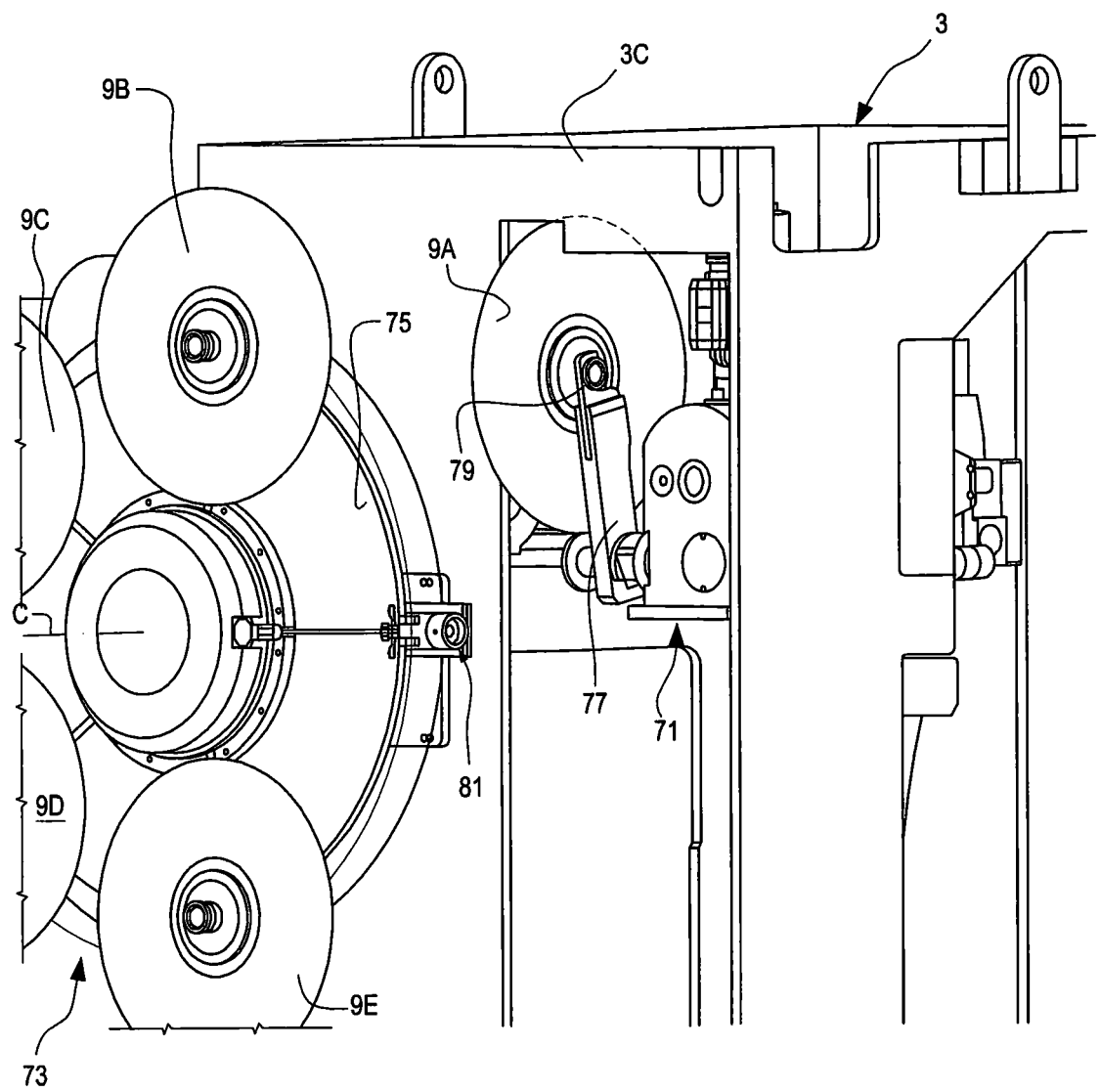
Figure 9F:
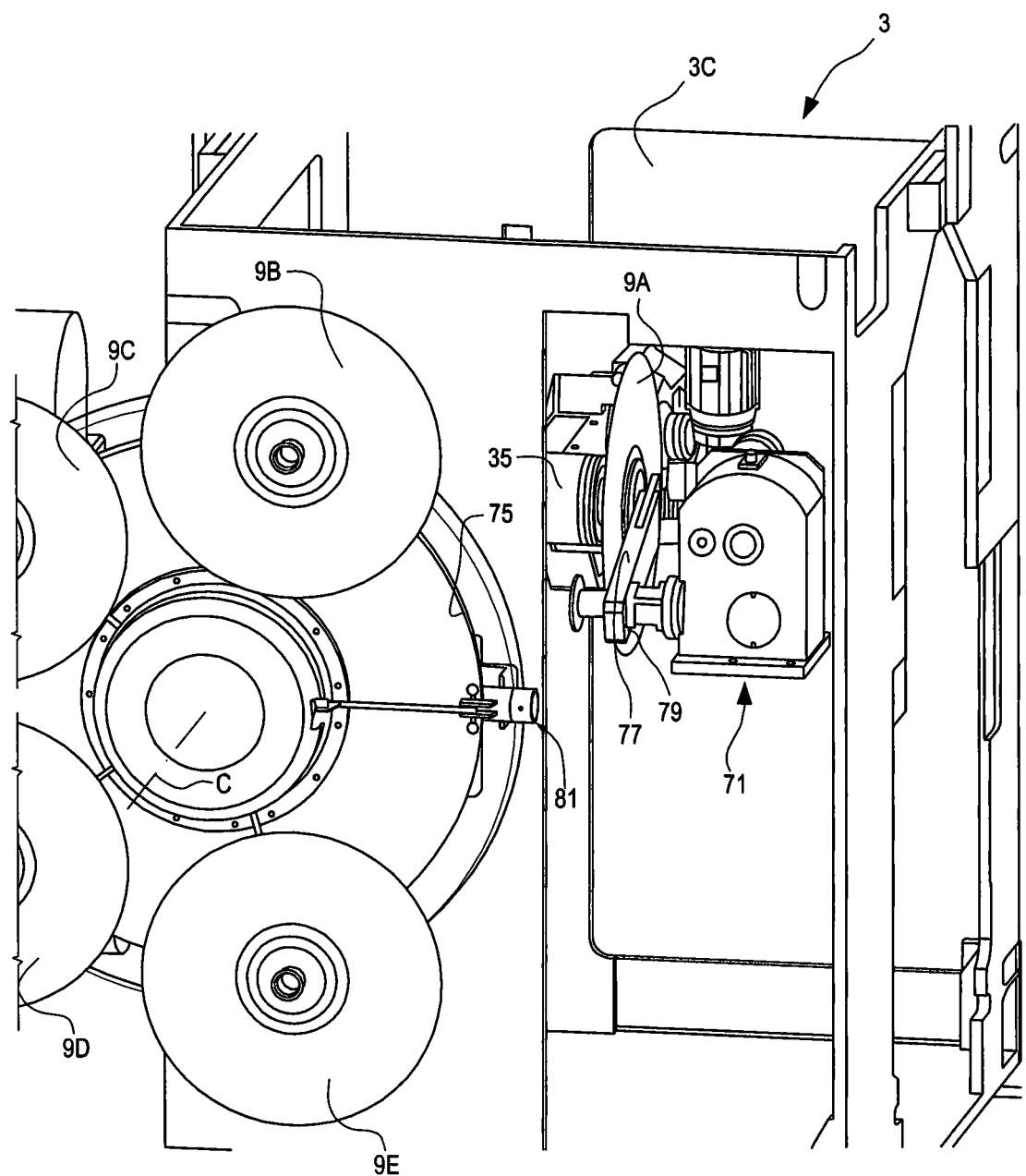
Figure 9G:
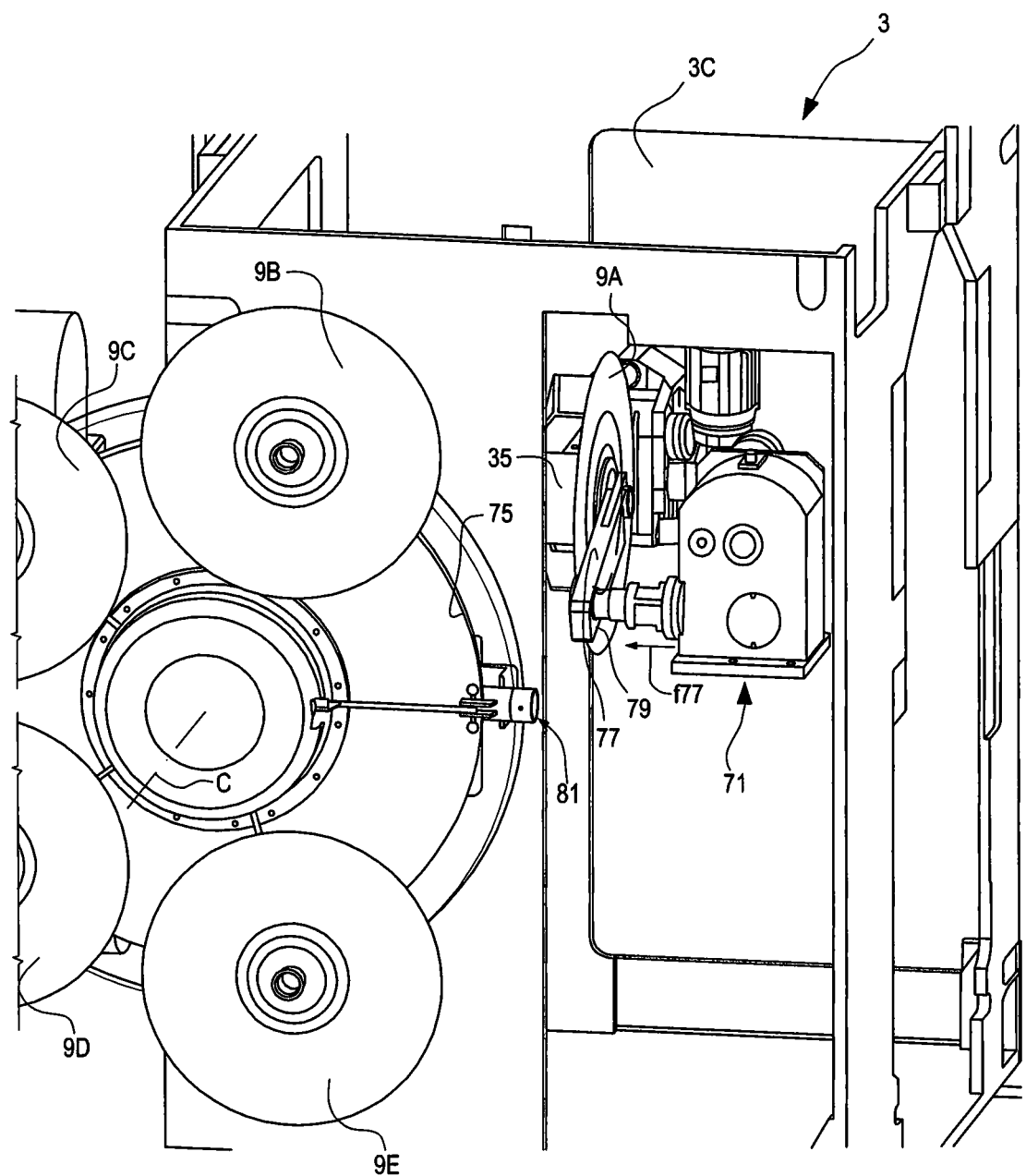
Figure 9H:
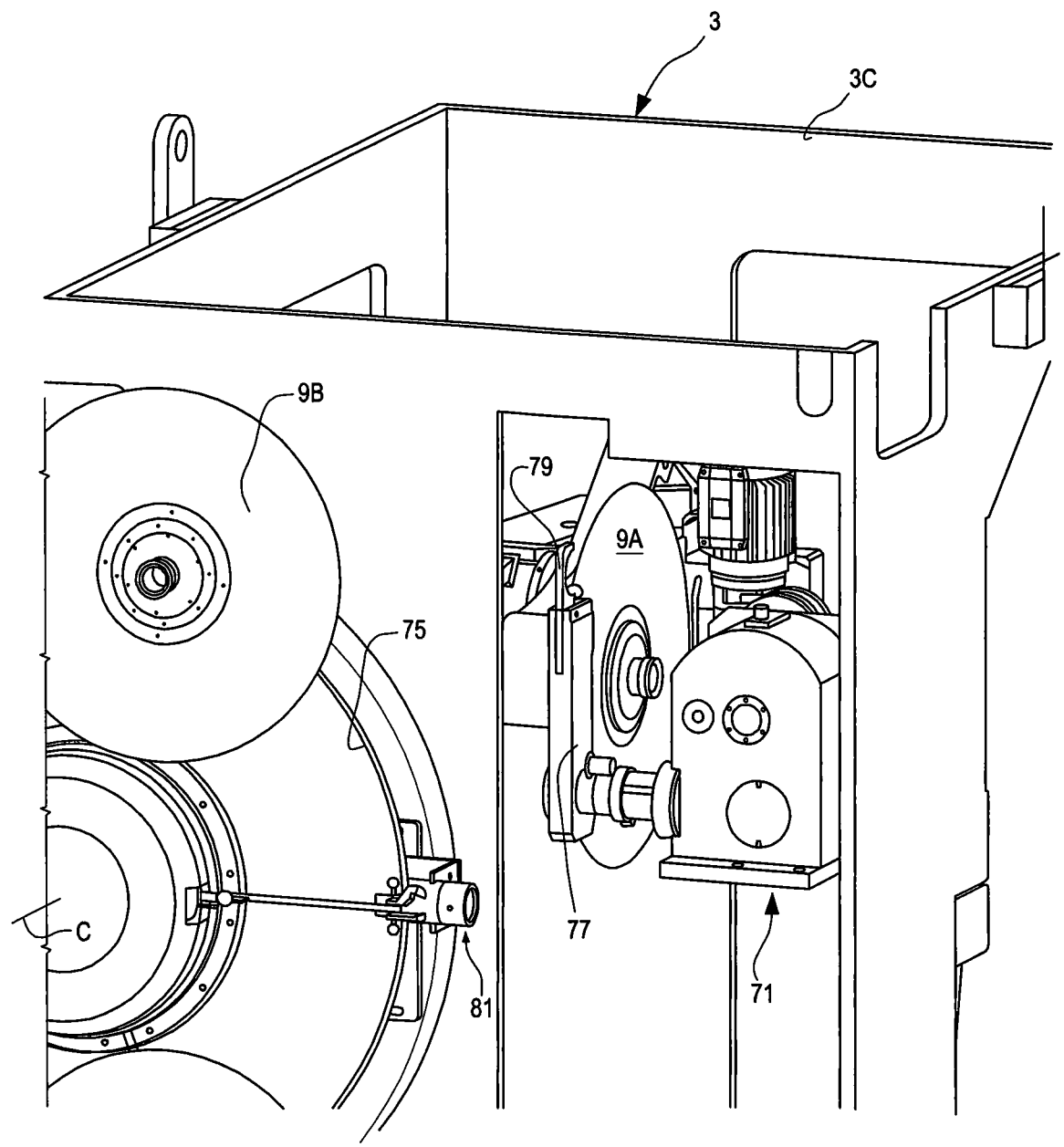
Figure 9I:
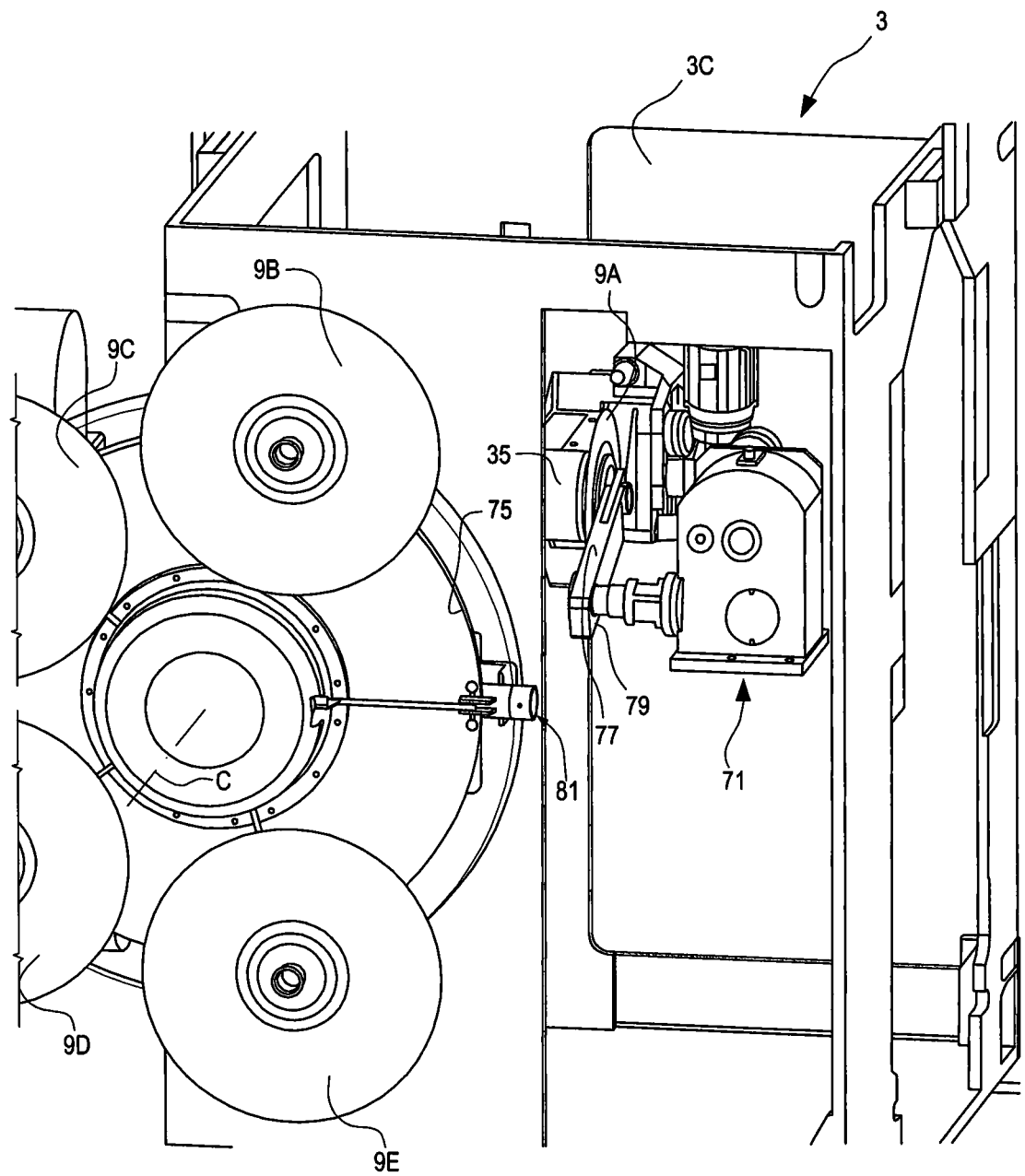
Figure 9J:
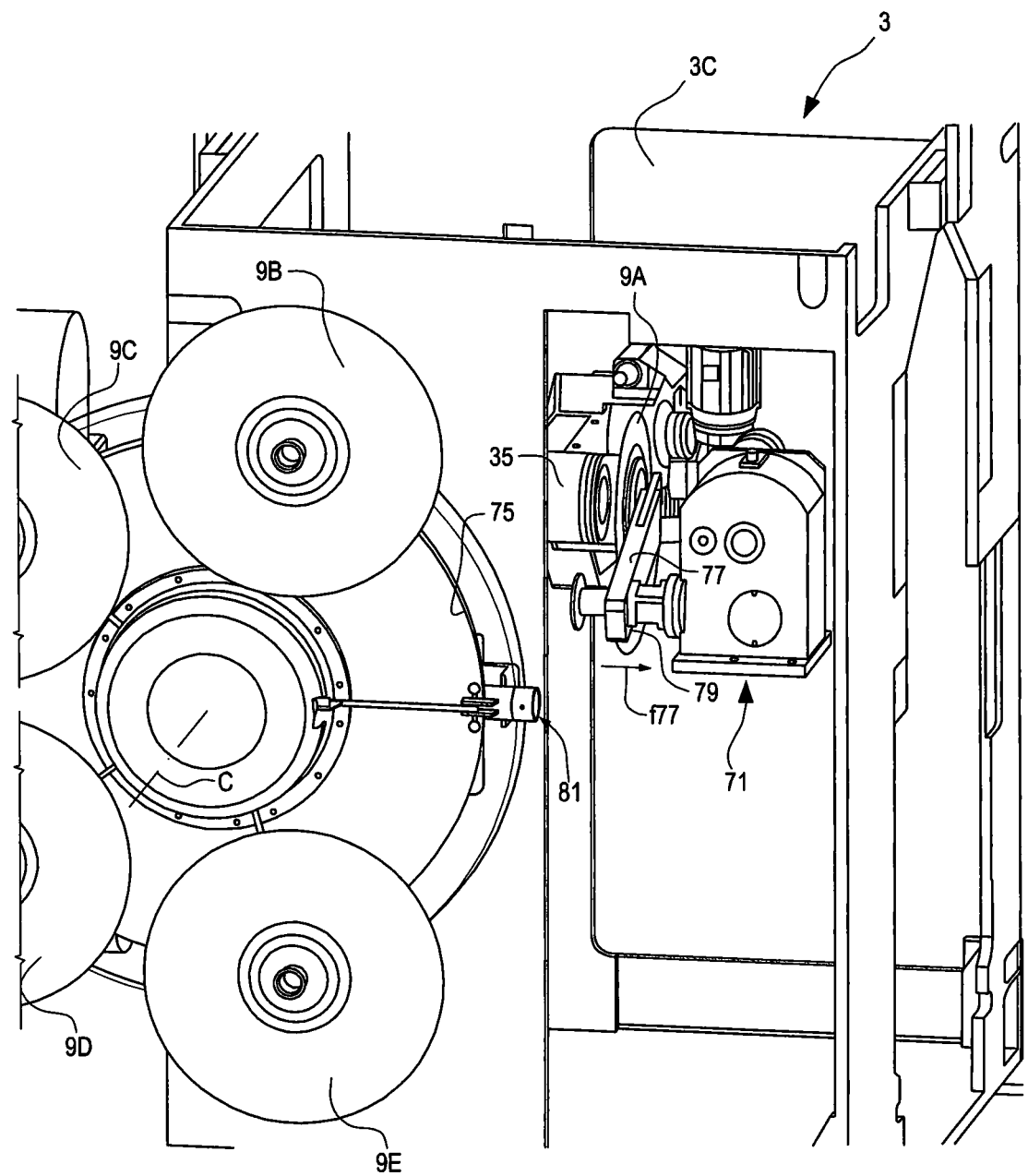
Figure 9K:
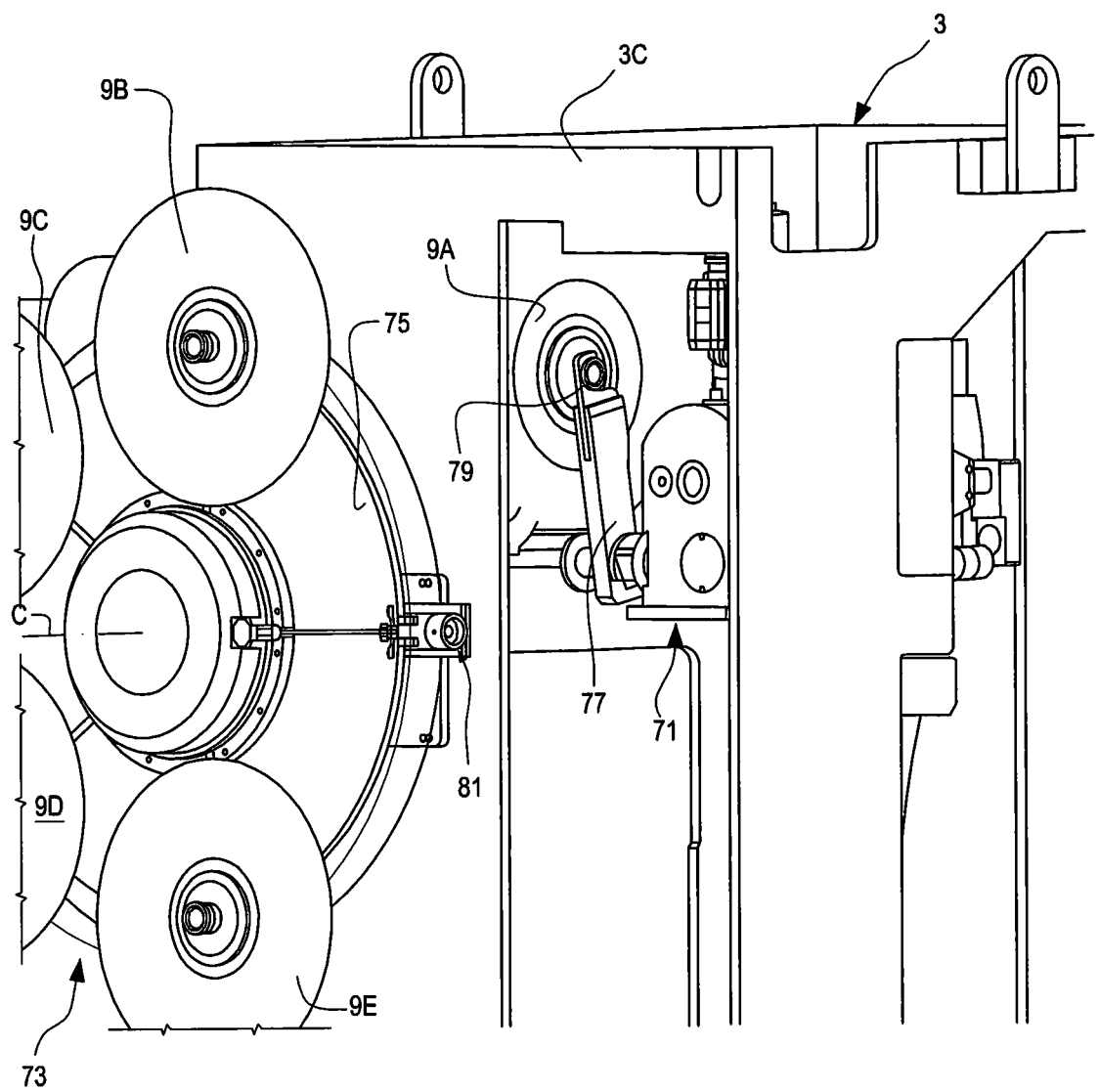
Figure 9L:
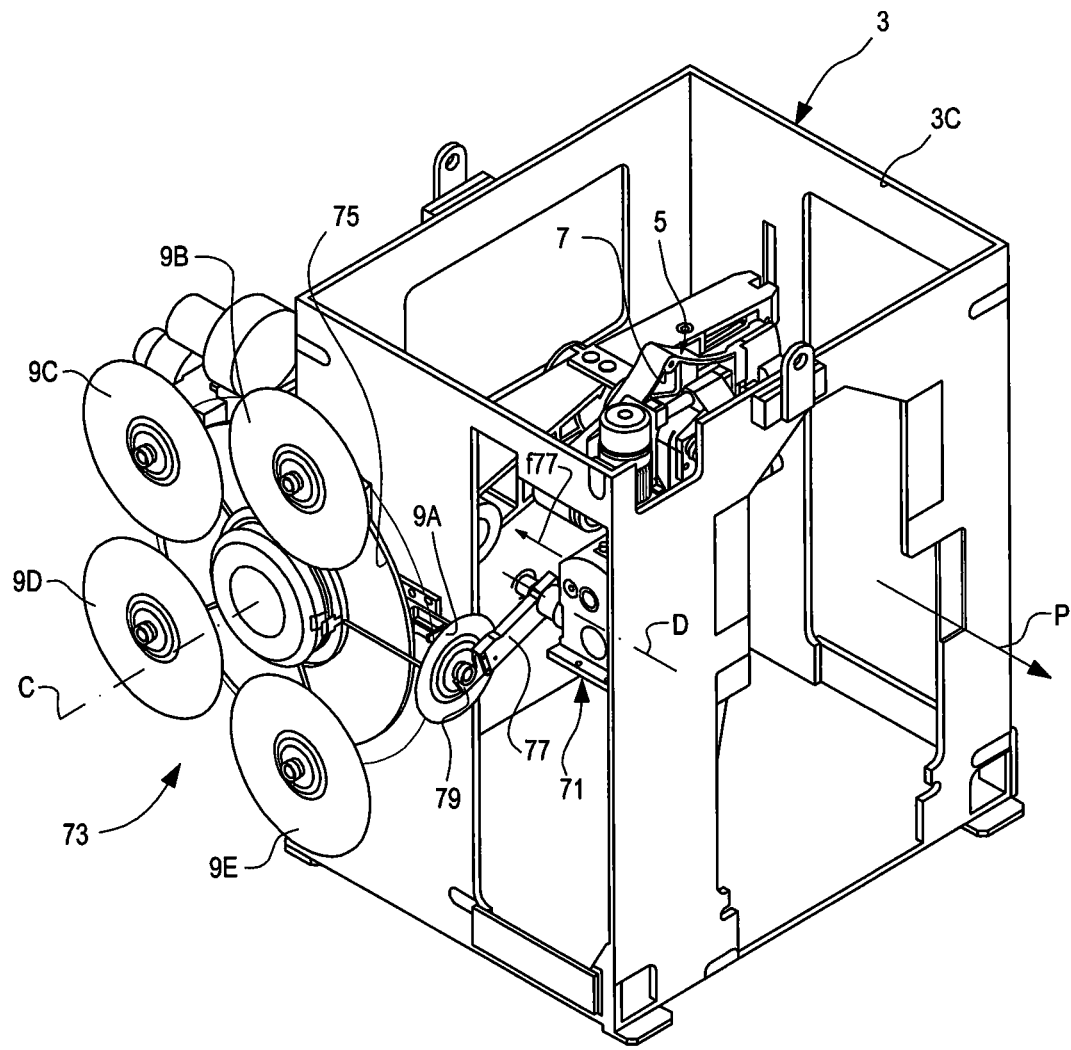
Figure 9M:
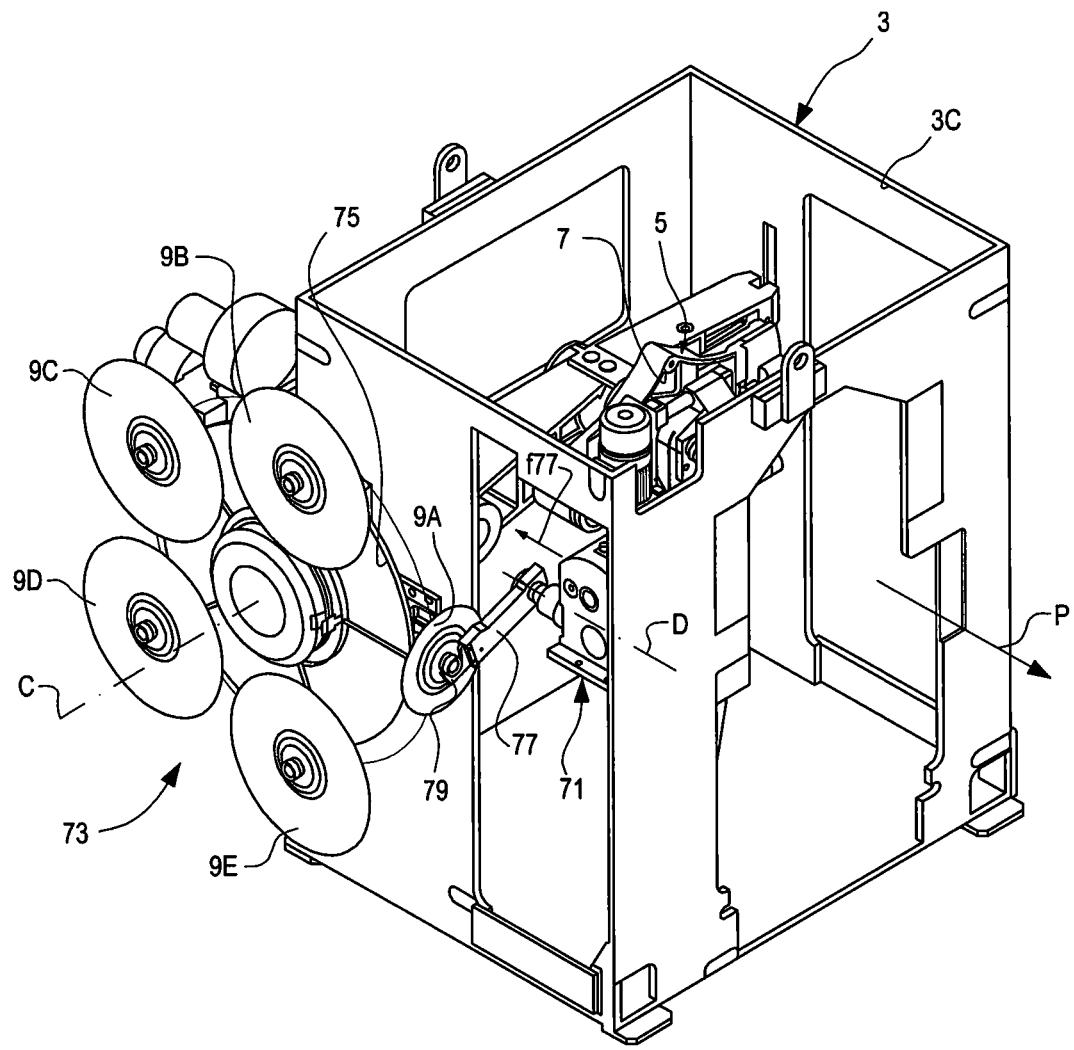
Figure 9N:
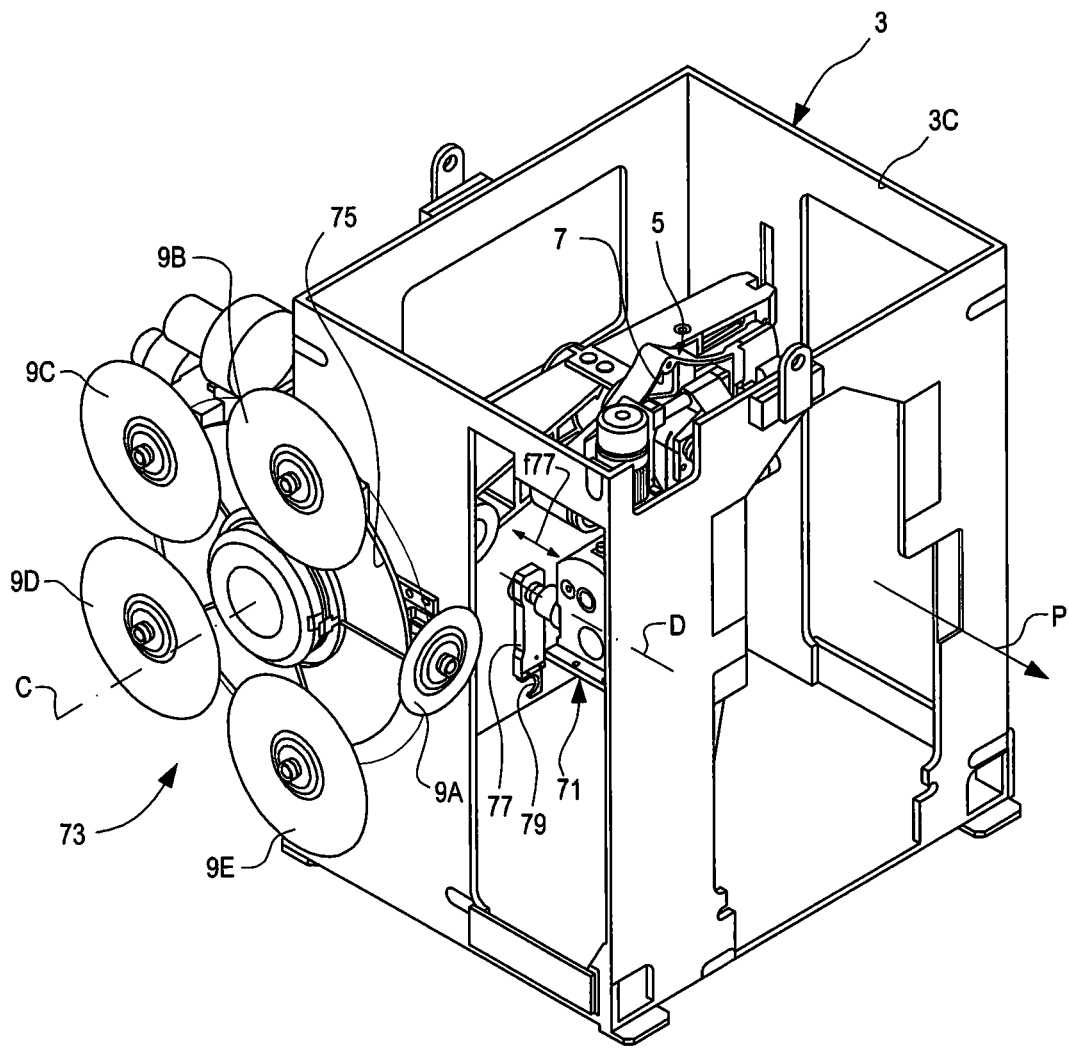
Figure 9O:
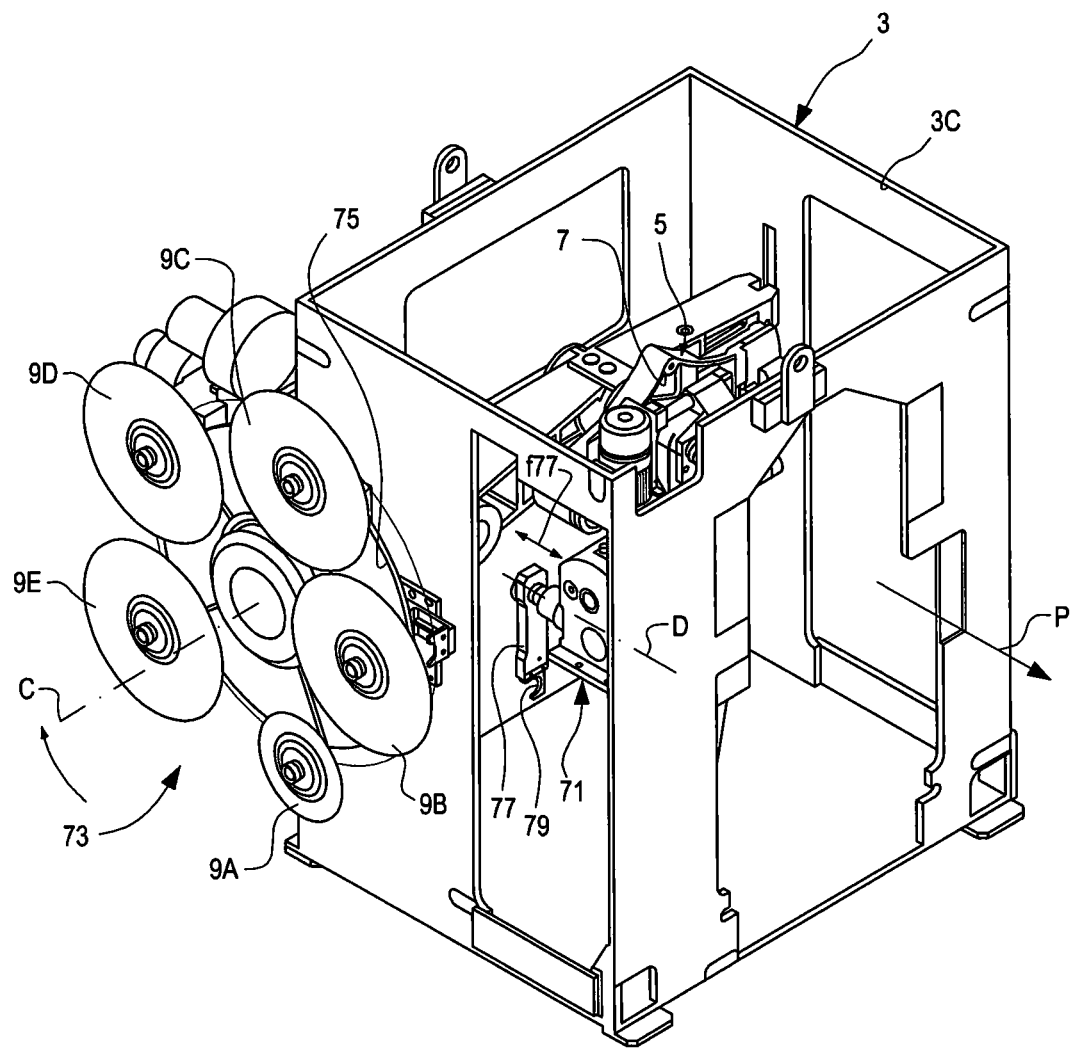

In FIGS. 9A-9O a containment casing 3C is shown, inside which the cutting station is arranged, which is indicated as a whole with number 3 and of which the cutting head 5 with the orbital head 7 is shown. The log advancing members have been omitted, as well as other members of the cutting machine 1 that can be configured in a known manner and are not relevant for the understanding of the present invention.

FIGS. 9A-9O number 71 indicates, as a whole, a handling member for the replacement of the worn disc-shaped cutting blades with new disc-shaped cutting blades. Number 73 indicates a storage unit, where the new disc-shaped cutting blades 9 and the worn disc-shaped cutting blades, removed from the cutting head 5, are held.

The shape of the handling member 71 and the shape of the storage unit 73 illustrated in FIGS. 9A-9O are given just by way of non-limiting example. It should be understood that the handling member 71 can be configured differently, provided that it is suitable to perform the operations described below to put the disc-shaped cutting blade 9 onto the cutting head 5 and to replace it with a new disc-shaped cutting blade 9.

Similarly, the storage unit 73 can be configured in a different manner than that described herein and illustrated in FIGS. 9A-9O, provided that it is suitable to perform the operations described below.

In the embodiment illustrated in FIGS. 9A-9O, the storage unit 73 comprises a carousel-shaped blade holder (here below also simply carousel) indicated as a whole with number 75, that can rotate around an axis C. In the illustrated embodiment, the axis C is substantially 90°-oriented with respect to the rotation axis of the cutting head 5 and the feeding path of the logs L to be cut, the path being schematically indicated with the arrow P in FIG. 9A.

In a manner known per se, in some embodiments of the log cutting machine, the log feeding path can be non-parallel to the rotation axis of the cutting head 5, for example if the rotating support carrying the working disc-shaped cutting blade is provided with an oscillating movement, adjusting the position of the rotation axis of the disc-shaped cutting blade during the machine operation. Machines of this type, wherein the rotation axis of the head is skew with respect to the log feeding path are known by those skilled in the art. In this case, the rotation axis C of the carousel 75 of the storage unit 73 can be substantially at 90° with respect to the direction of the rotation axis of the cutting head 5, or to the rotation axis of the disc-shaped cutting blade mounted on the cutting head 5. The disc-shaped cutting blades 9 are mounted on the carousel 73 with their rotation axes substantially parallel to the axis C. As will be described below, to take the disc-shaped cutting blades from the storage unit 73 and/or to insert them again into the storage unit, they can be temporarily rotated by nearly 90° so as to arrange them with their respective rotation axis in the correct position to be mounted on the cutting head 5, i.e. with the rotation axis substantially parallel to the direction that the rotation axis takes when the disc-shaped cutting blade is mounted on the head.

It is also possible to provide a storage unit 73 with a carousel 75 rotating around an axis C oriented in a different manner than that illustrated, for instance at 90° with respect to the position of the axis C in FIGS. 9A-9O. However, an arrangement of this type has a greater side bulk, and could be therefore less convenient in some cases. Other more compact embodiments with coaxial disc-shaped cutting blades are described later on with reference to FIGS. 14 to 16.

In the condition illustrated in FIG. 9A, five disc-shaped cutting blades are arranged on the storage unit 73 and are indicated with the reference numbers 9A-9E. The disc-shaped cutting blades 9A-9E can be equal to one another and can be used in succession as the working disc-shaped cutting blade becomes worn.

In other embodiments, or in other modes of use of the cutting machine 1 described herein, it is also possible to put, on the storage unit 73, disc-shaped cutting blades 9A-9E different from one another, for example according to the nature of the material wound into the single logs L. In fact, it could be necessary to use blades of different hardness, different cutting edges, or having characteristics which vary according to the nature or the winding characteristics of the web material forming the logs.

In other embodiments, a storage unit 73 for the blades can be provided, where the disc-shaped cutting blades 9 are carried by means of a flexible loader, for example a belt conveyor, and not by means of a rigid carousel. In further embodiments, several storage units 73 can be provided, or a storage unit with multiple carousels or with multiple flexible members supporting seats for disc-shaped cutting blades 9, in order to increase the capacity of the storage unit.

To minimize the bulk of the storage unit 73 at the side of the feeding path P of the logs to be cut, in the illustrated embodiment the disc-shaped cutting blades 9A-9E are mounted with their rotation axes parallel to the rotation axis C of the carousel 75. Different arrangements are also possible, in which the disc-shaped cutting blades 9A-9E are arranged with their rotation axes orthogonal to the rotation axis C of the carousel 75.

As it will be described below, the seats of the storage unit 73, in which the disc-shaped cutting blades 9A-9E are housed, can rotate approximately by 90° about a vertical axis in order to arrange each seat in such a way that the respective disc-shaped cutting blade 9 can be inserted into or removed from the seat with the correct orientation.

The handling member 71 can comprise an arm 77 rotating or pivoting around an axis D, substantially parallel to the direction of the feeding path P of the logs to be cut. Moreover, the arm 77 can be provided with a movement according to the double arrow f77 in direction of the oscillation or rotation axis D.

The rotating arm 77 can have, at its distal end, a gripper or other gripping member 79, suitable to engage the disc-shaped cutting blades 9. In some embodiment, the gripper or other gripping member 79 is configured to co-act with the projection 63, with which the support member 57 described above is provided.

The operation of the storage unit 73 and of the handling member 71 is as follows.

In FIG. 9A, the cutting head 5 is devoid of disc-shaped cutting blade and in the storage unit 73 five new disc-shaped cutting blades 9A-9E are arranged.

In FIG. 9B, the rotation axis of the disc-shaped cutting blade 9A has been rotated by nearly 90°, so as to be nearly parallel to the feeding direction of the logs L through the cutting station 3 along the feeding path P.

In FIG. 9C, the rotating arm 77 of the handling member 71 has been rotated clockwise bringing the gripper 79 to co-act with the appendix or projection 63 of the disc-shaped cutting blade 9A to engage this latter at the groove 63S.

In FIG. 9D, the rotating arm 77 of the handling member 71 has moved according to the arrow f71, moving away from the storage unit 73 parallel to the feeding path P of the logs L to be cut, moving the disc-shaped cutting blade 9 away from the storage unit and removing it from the respective seat.

FIG. 9E shows the clockwise (in the drawing) rotation movement of the rotating arm 77 to bring the disc-shaped cutting blade 9A, taken from the storage unit 73, inside the cutting station 3. In the area of the storage unit 73 left free by the disc-shaped cutting blade 9A the seat 81 is visible, wherefrom the disc-shaped cutting blade 9A has been taken.

In FIG. 9F the rotation of the rotating arm 77 has brought the disc-shaped cutting blade 9A in axial alignment with the coupling 35 of the cutting head 5.

In FIG. 9G the rotating arm 77 is translated according to the arrow f77 to attach the disc-shaped cutting blade 9A on the coupling 35 of the cutting head 5.

In FIG. 9H, the rotating oscillating arm 77 starts to exit, or to move far from, the area in which the disc-shaped cutting blade 9A has been inserted, to start the cut.

The carousel 75 of the storage unit 73 has remained fixed in the angular position previously taken to allow the disc-shaped cutting blade 9A to be picked up.

When, due to repeated grinding operations, the disc-shaped cutting blade 9A is worn and shall be replaced, or when the disc-shaped cutting blade shall be replaced for any other reason, for example because it is broken, the rotating arm 77 is brought in the position illustrated in FIG. 9I. In this position, the rotating arm 77 engages, with the gripper 79, the projection or appendix 63, integral with the disc-shaped cutting blade 9A.

In FIG. 9J, the rotating arm 77 of the handling member 71 has moved according to the arrow f77 to move, in a direction parallel to the rotation axis, the cutting blade 9A away from the coupling 35 provided on the cutting head 5.

In FIG. 9K, the disc-shaped cutting blade 9A is exiting the cutting station 3 due to counterclockwise rotation (in the figure) of the arm 77.

In FIG. 9L, the arm 77 has brought the worn disc-shaped cutting blade 9A in axial alignment with the seat 81, previously left free, while in FIG. 9M the rotating arm 77 is moved parallel to its rotation axis to engage the shank 51 of the worn disc-shaped blade 9A in the seat 81.

In FIG. 9N, the rotating arm 77 is in a low position and the worn disc-shaped cutting blade 9A can rotate by 90° to reach again the position where the rotation axis thereof is oriented approximately at 90° with respect to the feeding direction of the log L along the feeding path P.

In FIG. 9O, the carousel 75 of the storage unit 73 has rotated by ⅕ of a round angle, to bring a new disc-shaped cutting blade 9B in the pickup position. From this position, the cycle described above is repeated in order to bring the new disc-shaped cutting blade 9B in working position, engaged on the coupling 35 of the cutting head 5 and start again the cut of the logs L.

In FIGS. 9I-9O, the disc-shaped cutting blade 9A has a smaller diameter than that shown in FIGS. 9A-9H, because the blade 9A is replaced after being decreased in diameter due to wear resulting from repeated grinding.

The entire cycle of replacement of a worn blade with a new one, shown in the sequence of FIGS. 9I to 9O requires a very short time, in the order of 1-3 min. This is the time the cutting machine 1 is stopped. When the worn disc-shaped cutting blade 9A has been replaced with the new disc-shaped cutting blade 9B, the cutting machine can start cutting again. The time necessary to replace the cutting device 9A is so short that it is not necessary to stop the machines upstream of the cutting machine. The flow of new logs L produced for example by an upstream rewinding machine is temporarily taken by a storage unit arranged between the rewinding machine and the cutting machine 1 described herein.

The cycle illustrated above of replacing a worn disc-shaped blade is schematically shown in a front view in the sequence of FIGS. 10A-10J. In FIGS. 10F-10J, the disc-shaped cutting blade 9 has a smaller diameter, to illustrate that it is worn.

FIG. 11 shows a possible configuration of the seats 81, with which the storage unit 73 is provided. A seat 81 can be equipped with a bushing 83 provided an inner hole 85, in which the shank 51 of the support member 57 fastened to the disc-shaped cutting blade 9 is inserted. The shank 51 has a groove 51S, within which balls 87 can engage, biased by springs 89 in radial direction, so as to form a reversible lock that holds the disc-shaped blade 9 by means of the shank 51 in the seat 81.

As shown in FIG. 11, the bushing 83 can be hinged, at 83A, to a bracket 91 in turn hinged, at 93, to the carousel 75. A tie rod 95 controlled by an actuator (not shown) is hinged at 97 to the bracket 91. A movement of the tie rod 95 according to the arrow f95 causes an oscillation, according to the double arrow f81, of the seat 81 and more specifically of the bushing 83 about the hinge 93, consequently to rotate by 90° the axis of the disc-shaped blade 9 from the rest position (FIGS. 9A and 11) to the pick-up position, i.e. where the rotating arm 77, see FIG. 9B, picks it up.

As indicated above, the wear of the disc-shaped cutting blades used in cutting machines of the type described here is mainly due to the need for repeated grinding of the cutting edge of the disc-shaped cutting blades, which become blunt due to the interaction with the cellulose fibers forming the web material of the logs L and with the cardboard that usually forms the tubular winding core around which the log is formed.

As mentioned with reference to FIGS. 2 and 3, the cutting head 5 is provided with two grinding units 31, 33 to grind the two opposite sides of a cutting edge, with which the disc-shaped cutting blade 9 is provided. Grinding is performed periodically and automatically, i.e. grinding is repeated over the time not necessarily at regular intervals, but for example depending on the number of cuts performed by the disc-shaped cutting blade 9 and/or the hardness of the product to be cut. Grinding is carried out by moving the grinding wheels of the grinding units 31, 33 towards the cutting edge of the disc-shaped cutting blade 9 by means of a movement of the slide 21 controlled by the gear motor 25 (FIG. 2).

In order to correctly grind the cutting edge of the disc-shaped cutting blade 9, it is necessary that, every time the tool is replaced, the grinding wheels of the grinding units 31, 33 are brought into the correct position with respect to the disc-shaped cutting blade 9. This adjustment of the grinding unit with respect to the position of the new disc-shaped cutting blade 9 installed on the cutting head 5 is currently performed manually, with the operator entering the machine in the area where there is the disc-shaped cutting blade 9. This is a serious danger to the operator and prolongs the down times.

According to what described, in some embodiments a mechanism can be provided for automatic adjustment of the grinding wheels of the grinding units 31, 33 every time the tool is replaced, which does not require the operator to enter the cutting machine 1. What described below with specific reference to FIGS. 12 and 13 as regards the automatic adjustment of the grinding units 31, 33 is particularly advantageous when applied in combination with an automatic tool replacement system, i.e. a system to automatically replace the disc-shaped cutting blade 9 as described above.

However, advantages can be achieved by the adjustment system illustrated hereinafter also in machines where the replacement of the worn disc-shaped cutting blade with a new disc-shaped cutting blade takes place manually. In any case, the adjustment of the grinding wheels according to what described below allows to reduce the time the operator shall remain inside the cutting machine 1 in the area where the disc-shaped cutting blade 9 is positioned; therefore, it also allows to reduce the possibility of accidents due to the contact between the operator and the cutting edge of the disc-shaped cutting blade 9, and reduces the machine downtime.

Below, two embodiments will be described of a grinding unit, which can be indifferently the grinding unit 31 or the grinding unit 33. These two grinding units can be d in equivalent or substantially equal manner. In fact, the two grinding units may substantially differ only in this respect, that one of the grinding units works by pushing the respective grinding wheel against a first side of the cutting edge of the disc-shaped cutting blade 9, while the other grinding wheel is pulled against the opposite side of the same cutting edge.

Therefore, only one grinding unit 31, 33 will be described below.

With initial reference to FIG. 12, in a possible embodiment the grinding unit 31, 33 comprises a grinding wheel 101 that may be advantageously supported by a rotation shaft 103. The rotation shaft 103 is preferably mounted idle in a bushing 105 forming a support for the rotating shaft 103.

Number 107 indicates support bearings for the rotating shaft 103, and Y-Y indicates the rotation axis thereof.

In some embodiments, the bushing 105 is housed inside a sleeve 109, or a recirculating ball sleeve, or other member that allows low-friction movement of the bushing 105 according to the double arrow f105.

Advantageously, the rotation shaft 103 is mounted in the bushing 105, which forms a support for the rotation shaft, so that it can rotate idle inside the bushing 105 by means of bearings 107, but cannot move axially, i.e. parallel the rotation axis Y-Y with respect to the bushing 105. Therefore, the bushing 105, the rotation shaft 103 and the grinding wheel 101 move integrally along the arrow f105.

In some embodiments, with the bushing 105 forming the support for the rotation shaft 103 a brake or locking member 111 is associated, which allows to lock axially the bushing 105 (and therefore the rotation shaft 103 and the grinding wheel 101) with respect to an external housing 113, through which the grinding unit 31, 33 is fixed to the slide 21.

In some embodiments, the brake or locking member 111 may be mounted on the housing 113 externally to an internal cavity 113A, where the sleeve or ball recirculating sleeve 109 and the bushing 105 can be housed. To act on the bushing 105 and lock it with respect to the housing 113, the brake or locking member 111 is constrained, at one side, to the housing 113 and, at the other side, it cooperates with an extension 105A of the bushing 105. The extension 105A can be coaxial with the axis Y-Y of the rotation shaft 103 and pass through the brake 111. This latter can be provided with clamping jaws (not shown), acting on the extension 105 A.

The extension 105A can be hollow, so that the rotation shaft 103 may optionally extend at 103A through the extension 105A of the bushing 105, up to an end opposite the grinding wheel 101, where a hand wheel 115, torsionally coupled to the rotation shaft 103, can be provided.

The bushing 105 with its extension 105A can be resiliently biased in a direction indicated by the arrow f105X or in the opposite direction (arrow f105Y) by means of one or two resilient member(s), acting against an abutment integral with the housing 113.

In the embodiment illustrated in FIG. 12, the grinding unit 31, 33 has two resilient members 121 and 123. In some embodiments, the two resilient members 121, 123 may be constituted by, or comprise, helical compression springs. In other embodiments, Belleville springs or other resilient members can be used.

The two compression springs or other resilient members 121, 123 apply two opposite spring forces onto the bushing 105. To this end, the resilient member 121 can be housed between a seat 125, constrained to the extension 105A of the bushing 105, and an abutment 127 integral with the housing 113. In this way, the compression spring or other resilient member 121 generates a thrust according to arrow f105Y, which forces the bushing 105 to move in that direction with respect to the housing 113. In some embodiments, the compression degree of the spring 121 can be adjusted by means of a screw system that changes the position of the seat 125.

The compression spring or other resilient member 123 is arranged between an abutment 129, integral with the housing 113, and a seat 130, integral with the bushing 105. In this way, the spring or other resilient member 123 generates a thrust onto the bushing 105 oriented in the direction of the arrow f105X with respect to the housing 113.

The two springs or other resilient members 121, 123 may apply different forces so that the spring force acting on the bushing 105 is the resultant of the two spring forces generated by the two opposite resilient members 121, 123.

The operation of the grinding unit 31, 33 described above with reference to FIG. 12 will be explained below with reference also to FIGS. 2 and 3.

When a new disc-shaped cutting blade 9 shall be installed on the cutting machine 1, the slide 21 (FIGS. 2 and 3) of the cutting head 5 is brought to a withdrawn position, i.e. far from the coupling 35. In this position, the grinding wheels 101 of the two grinding units 31, 33 are distanced from the disc-shaped cutting blade 9, which can be therefore removed and replaced.

Once the new disc-shaped cutting blade 9 has been installed on the cutting head 5 by inserting the shank 51 into the coupling 35, the slide 21 is gradually approached, with an approach movement according to the arrow f21, from the withdrawn position to a nominal position, closer to the new disc-shaped cutting blade 9, wherein the grinding wheels 101 of the two grinding units 31, 33 are located at short distance, for example 1-2 mm, from the cutting edge of the disc-shaped blade 9. From this position, the two grinding wheels 101 shall be adjusted to move to the correct position, where they act with sufficient pressure against the respective side of the cutting edge of the disc-shaped cutting blade 9.

During the translation movement from the withdrawn position to the nominal position, the bushing 105 forming the support for the rotation shaft 103 of the grinding wheel 101 remains stationary with respect to the housing 113, due to the effect of the clamping member or brake 111. This locks the extension 105 A of the bushing 105 to the housing 113.

Once the nominal position has been achieved, where the grinding wheels 101 are at very short distance with respect to the cutting edge of the disc-shaped cutting blade 9 inserted on the coupling 35, the brake 111 is deactivated. Consequently, the spring system 121, 123 pushes the respective grinding wheel 101 against the side of the disc-shaped cutting blade 9. As previously mentioned, the two grinding units 31, 33 can differ in the direction, in which the grinding wheels are biased against the side of the cutting edge of the disc-shaped cutting blade 9. In general, as it can be seen in particular in FIG. 3, the two grinding wheels are arranged so as to work on the two sides, but they are carried by the respective rotation shafts 103, which are both directed to the same side with respect to the plane where the cutting blade 9 lies.

Consequently, in order to act on the two opposite sides of the cutting edge of the disc-shaped cutting blade 9, one grinding wheel 101 must be pushed in the direction f105X against the respective side of the cutting edge of the disc-shaped cutting blade 9, while the other grinding wheel 101 of the other grinding unit shall be pulled in the direction of the arrow f105Y to act against the opposite side of the same edge. The two grinding wheels 101 can be equal to each other and have two equal faces 101 A, 101B, both provided with abrasive material, only one of which works on the respective side of the edge. The grinding wheels can be reversible, so that when one of the two faces of the grinding wheel is worn out, the grinding wheel can be turned so as to use the other face.

The thrust in one or other of the two directions f105X, f105Y can be obtained by selectively acting on the characteristics and/or on the preload of the springs 121, 123 or other equivalent resilient members. Alternatively, only one of the two springs 121, 123 can be provided on each grinding unit 31, 33. In this case, the grinding unit that works on the cutting edge of the disc-shaped cutting blade 9 by means of the face 101A of the grinding wheel 101 will be provided with only one compression spring 121, while the grinding unit that works on the cutting edge of the disc-shaped cutting blade 9 by means of the face 101B of the respective grinding wheel 101 will be provided only with the spring 123.

Once the slide 21 has been brought, through the gear motor 25, into the nominal position, the brake or lock 111 is released and the resultant spring force of the springs 121, 123 causes a controlled approach movement of the respective grinding wheel 101 towards the corresponding side of the cutting edge of the disc-shaped cutting blade 9. The thrust of the resilient force acting on the bushing 105 moves the bushing axially according to the direction of the axis Y-Y, with simultaneous movement of the rotation shaft 103 axially constrained to the bushing 105. The force of the springs 121, 123 or other resilient members is measured so that the force exerted by the respective grinding wheel 101 against the side of the cutting chamfer of the disc-shaped cutting blade 9 is compatible with a correct operation of the grinding wheels 101.

Once the axial position defined by the abutment of the respective grinding wheel 101 against the flank or side of the cutting edge of the disc-shaped cutting blade 9 has been achieved, the brake 111 may be activated again to lock the respective rotation shaft 103 in the final position reached in this operational phase. From this moment, the grinding wheels 101 move together with the slide 21 and are driven into rotation by contact with the disc-shaped cutting blade 9, being supported by the idle rotation shafts 103, without any axial movement according to the axis Y-Y of the rotation shaft 103, of the grinding wheel 101 or of the bushing 105.

With the arrangement described above, it is therefore possible to substantially automatically adjust the position of the grinding wheels 101 at the beginning of the operating cycle of a new disc-shaped cutting blade 9, without the need for the operator to access the inside of the cutting station 3.

The housing 113 can be provided with an external thread 113F in order to be screwed in a threaded seat in the slide 21, provided with a tightening screw (schematically indicated at 100 in FIG. 3) to adjust the initial mutual position between the housing 113 and the slide 121. Preferably, when the grinding wheel 101 is new, the rotation shaft 103, and therefore the bushing 105, are positioned towards the end which allows the greater stroke of the grinding wheel 101, in order to ensure a greater number of movements towards the disc-shaped cutting blade 9. This occurs because, every time the disc-shaped cutting blade 9 is replaced, the grinding wheel 101 shall perform a forward movement towards the disc-shaped cutting blade 9, thus balancing the wear of the grinding wheel 101. The direction of the automatic approach movement of the grinding wheel 101 is, in fact, given by the resultant of the forces of the resilient members 121 and 123 that is always oriented in the same direction. In this way, the forward stroke of the grinding wheel 101 does not end before the grinding wheel has been replaced. It is understood that this initial configuration is not binding; it is possible to start the movement of the grinding wheel 101 also in other positions along the stroke of the rotation shaft 103 and hence of the bushing 105.

FIG. 13 shows a further embodiment of a grinding unit 31, 33, which can be used in the cutting head 105 to perform the automatic adjustment of the initial position of the grinding wheel 101. Equal or equivalent parts are indicated with the same reference numbers used in FIG. 12.

In this embodiment, the rotation shaft 103 of the grinding wheel 101 is idly supported by means of bearings 107 inside a bushing 105, which is coupled to the housing 113 by means of a threaded coupling, the bushing 105 is provided with. In the illustrated embodiment, this coupling is an indirect coupling through a threaded sleeve 108, which presents a female thread, cooperating with a male thread 105F provided on the outside of the bushing 105. In this way, as it will be clearer below, by rotating the bushing 105 around the axis Y-Y the bushing translates parallel to said axis.

The bushing 105 extends at 105 A with a hollow shaft through which an extension 103A of the rotation shaft 103 extends. The end of the extension 103A of the rotation shaft 103 has a hand wheel 115 that may co-act with a sensor 116 mounted by means of a bracket 118 integrally with the housing 113, for the purposes described hereinafter.

Moreover, the grinding unit 31, 33 has an actuator 131, for example an electronically controlled electric motor, with a high speed reducing ratio, for transmitting the motion of the motor 131 to the extension 105A of the bushing 105. Number 133 indicates, by way of example, support bearings for the extension 105A of the bushing 105 allowing the rotation of the extension 105A around the axis Y-Y.

As mentioned above, due to the threaded coupling between bushing 105 and sleeve 108, the rotation of the bushing 105 controlled by the actuator 131 about the axis Y-Y causes a movement of the bushing 105 according to the double arrow f105 and, consequently, a movement of the rotation shaft 103 and of the grinding wheel 101, which are axially fixed to the bushing 105 as in the embodiment illustrated with reference to FIG. 12.

It is therefore possible to move the grinding wheel 101 parallel to the rotation axis thereof by means of the actuator 131.

A sensor 116 co-acting with the hand wheel 115 may detect the rotation of the grinding wheel 101 and consequently of the shaft 103, 103A.

In this configuration, the operation of the grinding unit 31, 33 is as follows.

To replace a worn disc-shaped cutting blade 9, firstly the slide 21 is translated into a withdrawn position, so as to distance the grinding wheels 101 from the disc-shaped cutting blade 9 to be replaced. The actuator 131 can be actuated to bring the bushing 105 in a zero position with respect to the housing 113.

Once the disc-shaped cutting blade 9 has been replaced with a new blade, the gear motor 25 can bring the slide 21, and consequently the two grinding units 31, 33, into a nominal position of approach towards the disc-shaped cutting blade 9. In the nominal position the grinding wheels 101 are near, but not in contact with, the sides of the cutting edge or chamfer of the disc-shaped cutting blade 9. After this position has been reached, the actuator 131 is actuated to cause a gradual and controlled approach of the respective grinding wheel 101 to the side of the cutting edge of the disc-shaped cutting blade 9. Since, as mentioned above, one of the grinding wheels 101 of the grinding units 31, 33 acts on one surface 101A and the other grinding wheel acts on the surface 101B, against the two opposite sides of the same cutting edge of the disc-shaped cutting blade 9, the two actuators 131 will be driven in opposite directions, to move in both cases the respective grinding wheel 101 towards the side of the cutting edge of the disc-shaped cutting blade 9.

The controlled approach movement is stopped when the respective grinding wheel 101 comes into contact with the side of the cutting edge of the disc-shaped cutting blade 9. In order to detect this contact condition, it is possible to operate, for example, by means of a load cell which measures an axial load applied to the bearing 107 or other load-supporting member in the direction Y-Y due to the contact between the grinding wheel 101 and the disc-shaped cutting blade 9. In other embodiments, the contact condition can be detected by the increase in current absorbed by the actuator 131, corresponding to an increase of the resistant torque, resulting from the mutual contact between the grinding wheel and the disc-shaped cutting blade.

In further embodiments, as shown in FIG. 13, this contact condition can be detected by the fact that the grinding wheel 101 is idly supported by means of bearings 107 and begins to rotate when it comes into contact with the disc-shaped cutting blade 9, if this latter is in turn held in rotation during the adjustment operations. In this case, the sensor 116 can be used, for instance, which can detect an angular movement of the hand wheel 115, indicative of the angular movement of the corresponding grinding wheel 101. In other embodiments, the angular movement can be detected, for example, by means of a sensor incorporated in the bearings 107 or associated therewith.

Regardless of the type of detection provided, the configuration of FIG. 13 allows to stop the movement of the bushing 105 according to f105, and therefore of the grinding wheel 101, when this latter has reached the correct position of approach to the disc-shaped cutting blade 9. The axial position is kept thanks to the brake effect of the actuator 131. In a possible operation mode, the use of the actuator 131 allows the axial movement of the grinding wheel 101 towards the disc-shaped cutting blade 9 (arrow f105) and a movement away from the disc-shaped cutting blade 9. In this way, it is possible to perform the approach to the disc-shaped blade 9 firstly by moving the grinding wheel 101 back and then by moving it forward until the first contact with the disc-shaped cutting blade 9 is detected.

Once the grinding units 31, 33 have been positioned correctly with respect to the disc-shaped cutting blade 9, the disc-shaped cutting blade 9 can be ground in a known manner. In particular, by means of the gear motor 25, the slide 21 can be periodically moved away from, and then moved towards, the disc-shaped cutting blade 9. The away and towards movements are controlled so that, at each intervention of the grinding units 31, 33, these are moved towards the rotation axis of the disc-shaped cutting blade 9 by several hundredths of a millimeter. This ensures that, for each approaching movement, the grinding wheels 101 actually grind the cutting edge of the disc-shaped cutting blade 9, slightly consuming the blade and thereby reducing the diameter thereof. After several grinding cycles, the disc-shaped cutting blade 9 may be replaced. Alternatively, the diameter of the disc-shaped cutting blade 9 can be detected directly, so as to replace the blade when the diameter has reached a minimum threshold value.

In the above described embodiments, the storage unit 73 for the blades 9A-9E comprises a carousel 75 rotating about an axis C substantially at 90° with respect to the rotation axis of the blade that is on the cutting head 5 of the cutting machine, and each blade is rotated by 90° so as to be brought into the position where it can be taken by the handling member 71, as shown for example in FIGS. 9A, 9B. This allows having a relatively high number of blades 9A-9E in the storage unit, while maintaining the space necessary for the blades and the storage unit limited compared to the size of the cutting machine, despite the relatively large diameter of the blades.

On other embodiments, to reduce the bulk of the blade storage unit, the storage unit can be configured so as to hold a plurality of blades coaxial with one another, with the axis parallel to the rotation axis of the head 5 of the cutting machine, i.e. parallel to the rotation axis of the blade mounted on the machine. FIGS. 14 to 16 show an embodiment of this type. These figures show only the elements necessary to understand the structure of the storage unit and the handling of the blades. The storage unit, indicated again with number 73, carries a series of spare blades 9A, 9B, 9D, 9E or worn blades. In FIG. 14, the blade 9C has been taken from the storage unit by means of the handling member 71, which can be substantially configured as described with reference to the previous figures. The storage unit 73 can comprise a series of seats 82 for retaining the blades. The seats 82 can be carried by a bearing structure or blade-holder 72, which may be movable according to the double arrow f72 to bring the individual seats 82 in pickup or load position with respect to the handling member 71. To this end, the blade-holder 72 may be slidingly connected to a stationary guide 76. The blade-holder 72 can be provided with a series of crossbars 72A, each of which can carry a seat 82. The distance between consecutive crossbars 72A is such as to permit insertion and removal of the blades 9.

The seats 82 and the storage unit 71 are arranged so that the blades 9A-9E supported in the storage unit are substantially coaxial to one another according to an alignment axis L-L, which may be substantially parallel to the rotation axis of the blade mounted on the cutting machine, in this example the blade 9C, or substantially parallel to the feeding direction of the logs to be cut.

In the scheme of FIGS. 14 to 16 the storage unit 73 is arranged above the cutting station 3 of the cutting machine and is displaced with respect to the centerline thereof. In other embodiments, the storage unit 73 can be centered, or arranged on one of the two sides of the cutting station, at the side of the feeding path of the logs to be cut.

In the embodiment of FIGS. 14 to 16, the seats 82 supporting the cutting blades 9A-9E are not required to pivot from a housing position inside the storage unit to a pick-up position. The result, however, is a rather limited space of the storage unit thanks to the adjacent and coaxial arrangement of the blades 9A-9E.

While the particular embodiments of the invention described above have been shown in the drawing and described integrally in the description above with features and characteristics relating to different example embodiments, those skilled in the art will understand the modifications, changes and omissions are possible without however departing from the innovative learning, the principles and the concepts described above and the advantages of the object described in the attached claims. Therefore, the scope of the invention described shall be determined only based upon the widest interpretation of the attached claims, so as to understand all the modifications, changes and omissions. Furthermore, the order or sequence of any step of method or process may be changed according to alternative embodiments.

The invention claimed is:
1. An arrangement comprising:
a cutting machine for cutting logs of web material comprising:
a feeding path for logs to be cut;
a cutting head arranged along the feeding path, said cutting head comprising a coupling for a disc-shaped cutting blade, and said cutting head being configured to impart the disc-shaped cutting blade a rotary motion around an axis thereof and a cyclic movement to cut the logs into rolls, and to allow the logs to move forward along the feeding path;

at least one store unit for disc-shaped cutting blades adapted to store a plurality of the disc-shaped cutting blades;

at least one handling member, which is movable with respect to the cutting head, to remove the disc-shaped cutting blade from the cutting head when the disc-shaped cutting blade is a worn disc-shaped cutting blade to be replaced, and to replace the worn disc-shaped cutting blade with a new disc-shaped cutting blade taken from the store unit;

wherein the store unit comprises a blade-holder adapted to house the plurality of disc-shaped cutting blades with respective disc-shaped cutting blade axes being aligned according to an alignment direction substantially parallel to the feeding path; wherein the blade-holder is adapted to move the disc-shaped cutting blades substantially parallel to the blade axes to selectively bring each disc-shaped cutting blade in a pick-up or load position with respect to the cutting head; and wherein the at least one handling member is adapted to position a worn disc-shaped cutting blade removed from the cutting head into an empty seat of the store unit, and is adapted to pick up a new disc-shaped cutting blade from the store unit and attach the new disc-shaped cutting blade to the cutting head.

2. The arrangement of claim 1, wherein the store unit is arranged above or on a side of a cutting station comprising the cutting head.

3. The arrangement of claim 1, wherein said blade-holder comprises a series of seats configured to retain the plurality of disc-shaped cutting blades.

4. The arrangement of claim 3, wherein said blade-holder is configured to be movable to bring an individual seat of said seats into the pick-up or load position to allow removal of a new disc-shaped cutting blade from the blade-holder or insert a worn disc-shaped cutting blade in the blade-holder.

5. The arrangement of claim 4, wherein the blade-holder is slidingly connected to a stationary guide.

6. The arrangement of claim 1, wherein said plurality of disc-shaped cutting blades in said store unit are arranged substantially coaxial to one another.

7. A method for cutting logs of wound web material, comprising steps of:

moving logs of web material sequentially along a feeding path in a direction parallel to axes of the logs;

cutting the logs by a disc-shaped cutting blade mounted on a cutting head and severing the logs into rolls of an axial length smaller than that of the logs, the cutting head moving the disc-shaped cutting blade with a cyclical motion to cut the logs and allow a forward movement of the logs along the feeding path;

periodically grinding the disc-shaped cutting blade;

when the disc-shaped cutting blade is so worn that the cutting blade is a worn disc-shaped cutting blade to be replaced:

temporarily stopping the forward movement of the logs;

removing the worn disc-shaped cutting blade from the cutting head, taking a new disc-shaped cutting blade from a store unit, transferring the new disc-shaped cutting blade to the cutting head and mounting the new disc-shaped cutting blade on the cutting head; and once the new disc-shaped cutting blade has been mounted on the cutting head, re-starting the forward movement of the logs along the feeding path;

wherein the store unit comprises a blade-holder arranged and configured to keep a plurality of disc-shaped cutting blades with respective cutting blade axes aligned according to an alignment direction substantially parallel to the feeding path;

wherein the blade-holder is adapted to move the plurality of disc-shaped cutting blades in a direction substantially parallel to the blade axes and to the alignment direction; and wherein at least one handling member is adapted to position the worn disc-shaped cutting blade removed from the cutting head into the store unit, and is adapted to pick up the new disc-shaped cutting blade from the store unit and attach the new disc-shaped cutting blade to the cutting head.

8. The method of claim 7, further comprising positioning the store unit above or on a side of the cutting head.

9. The method of claim 7, wherein the blade-holder includes a series of seats configured to retain the plurality of disc-shaped cutting blades.

10. The method of claim 9, further comprising configuring said blade-holder to be movable to said pick-up or loading position.

11. The method of claim 10, further comprising slidingly connecting the blade-holder to a stationary guide.

12. The method of claim 7, wherein said plurality of disc-shaped cutting blades in said store unit are arranged substantially coaxial to one another.

* * * * *